United States Patent [19]

Hamisch, Jr.

[11] 4,104,106

[45] Aug. 1, 1978

[54] LABEL PRINTING AND APPLYING APPARATUS

[75] Inventor: Paul H. Hamisch, Jr., Franklin, Ohio

[73] Assignee: Monarch Marking Systems, Inc., Dayton, Ohio

[21] Appl. No.: 649,603

[22] Filed: Jan. 15, 1976

Related U.S. Application Data

[60] Continuation-in-part of Ser. No. 449,111, Mar. 7, 1974, abandoned, which is a division of Ser. No. 312,454, Dec. 6, 1972, Pat. No. 3,968,745, which is a continuation-in-part of Ser. No. 208,035, Dec. 8, 1971, abandoned.

[51] Int. Cl.[2] ........................ B32B 35/00; B41K 1/00

[52] U.S. Cl. ................................... 156/384; 156/541; 156/584; 101/288; 101/292; 101/327

[58] Field of Search ............... 156/277, 384, 540, 541, 156/542, 584, 577, 579, DIG. 33; 101/288, 291, 292, 327; 242/75, 75.4, 76

[56] References Cited

U.S. PATENT DOCUMENTS

| | | | |
|---|---|---|---|
| 2,094,581 | 10/1937 | Bundick et al. | 242/75.4 |
| 2,720,994 | 10/1955 | Arvidson | 156/DIG. 33 |
| 3,193,211 | 7/1965 | Flood | 156/DIG. 33 |
| 3,468,739 | 9/1969 | Schrotz | 156/542 |
| 3,531,057 | 9/1970 | Way | 242/75.4 |
| 3,604,652 | 9/1971 | Sleeper | 242/75.4 |
| 3,881,979 | 5/1975 | Kelly | 156/384 |

*Primary Examiner*—Caleb Weston
*Attorney, Agent, or Firm*—Joseph J. Grass

[57] ABSTRACT

There is disclosed label printing and applying apparatus by which labels are successively printed and applied to merchandise. The apparatus feeds pressure sensitive labels mounted on a web of supporting material to a printing zone and to a delaminating zone. An applicator disposed downstream of the delaminating zone is used to apply the labels to merchandise.

32 Claims, 73 Drawing Figures

FIG-14
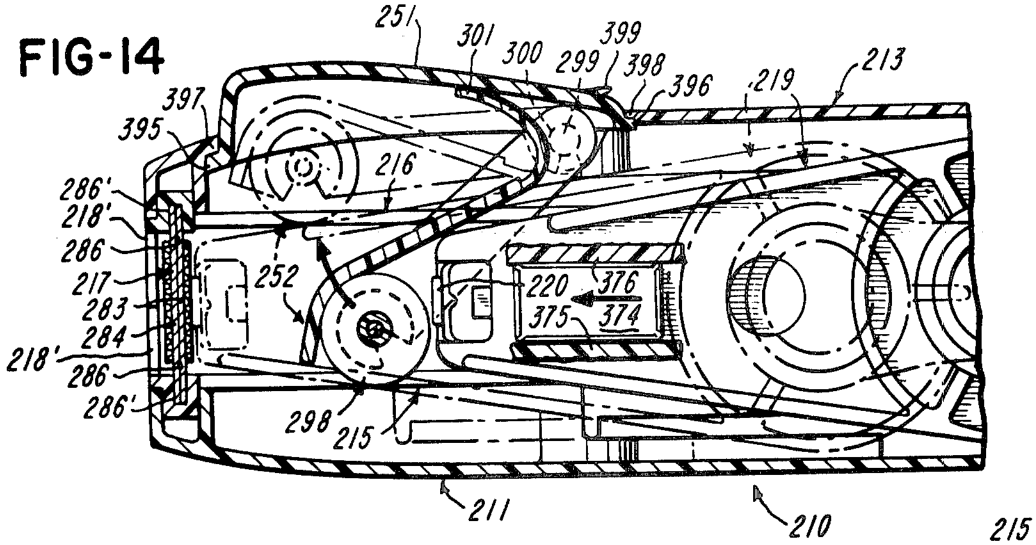
FIG-15
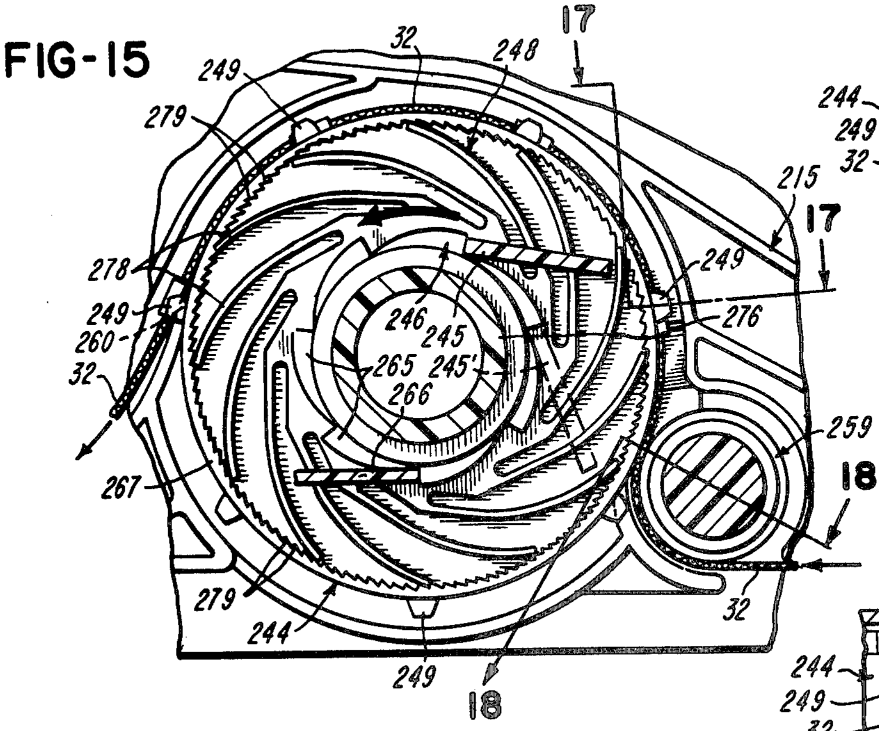
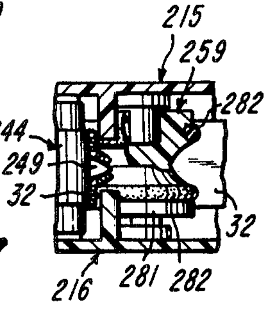
FIG-17
FIG-18
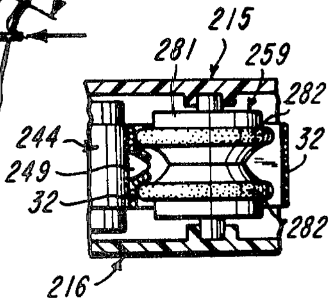
FIG-16
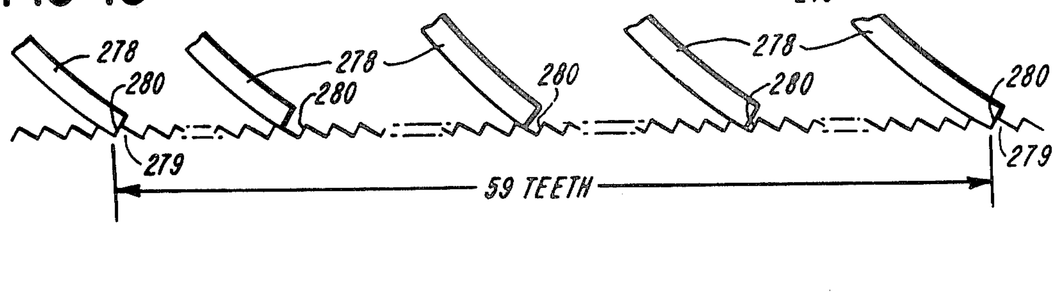

FIG-20
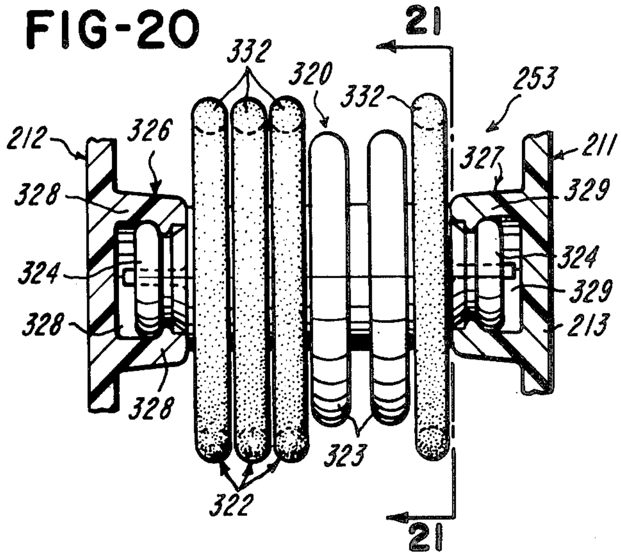
FIG-21
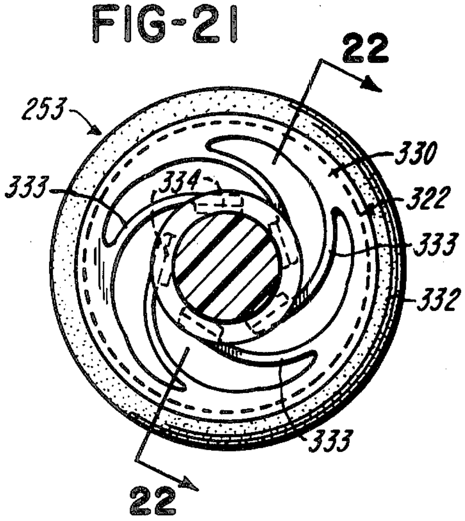
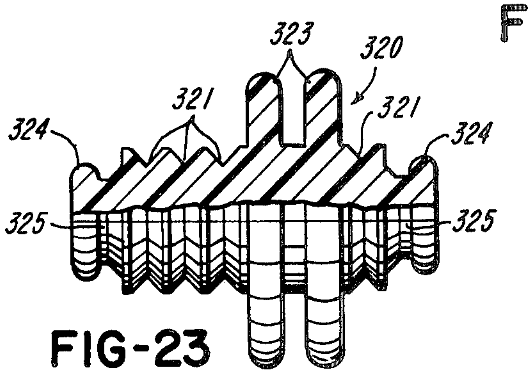
FIG-23
FIG-22
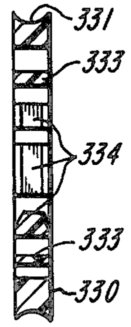
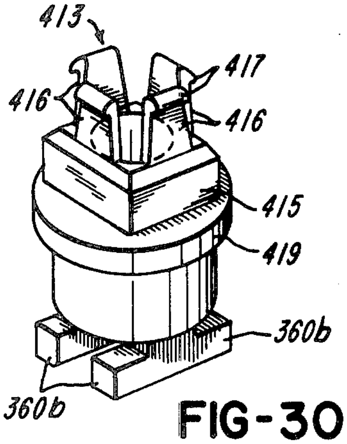
FIG-30
FIG-19
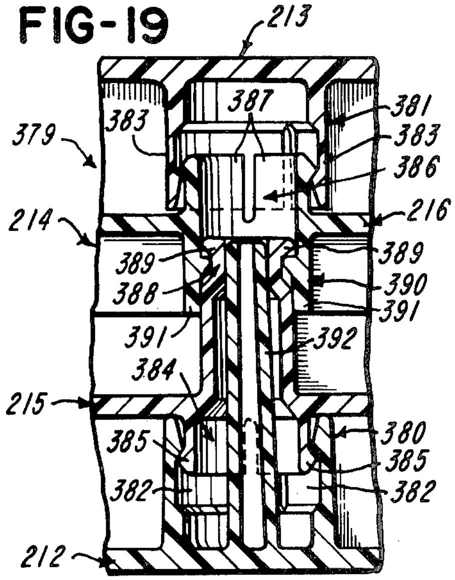
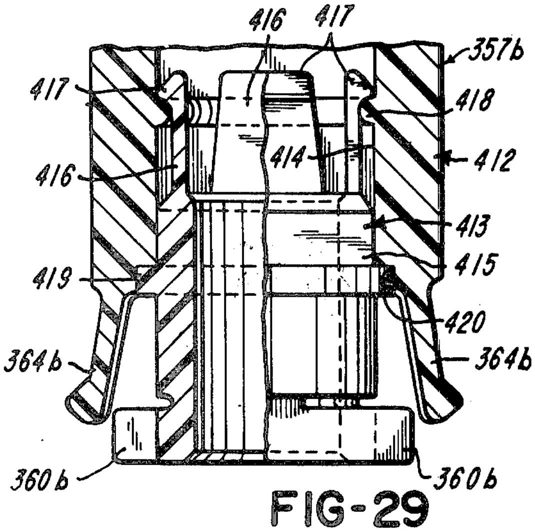
FIG-29

FIG-24
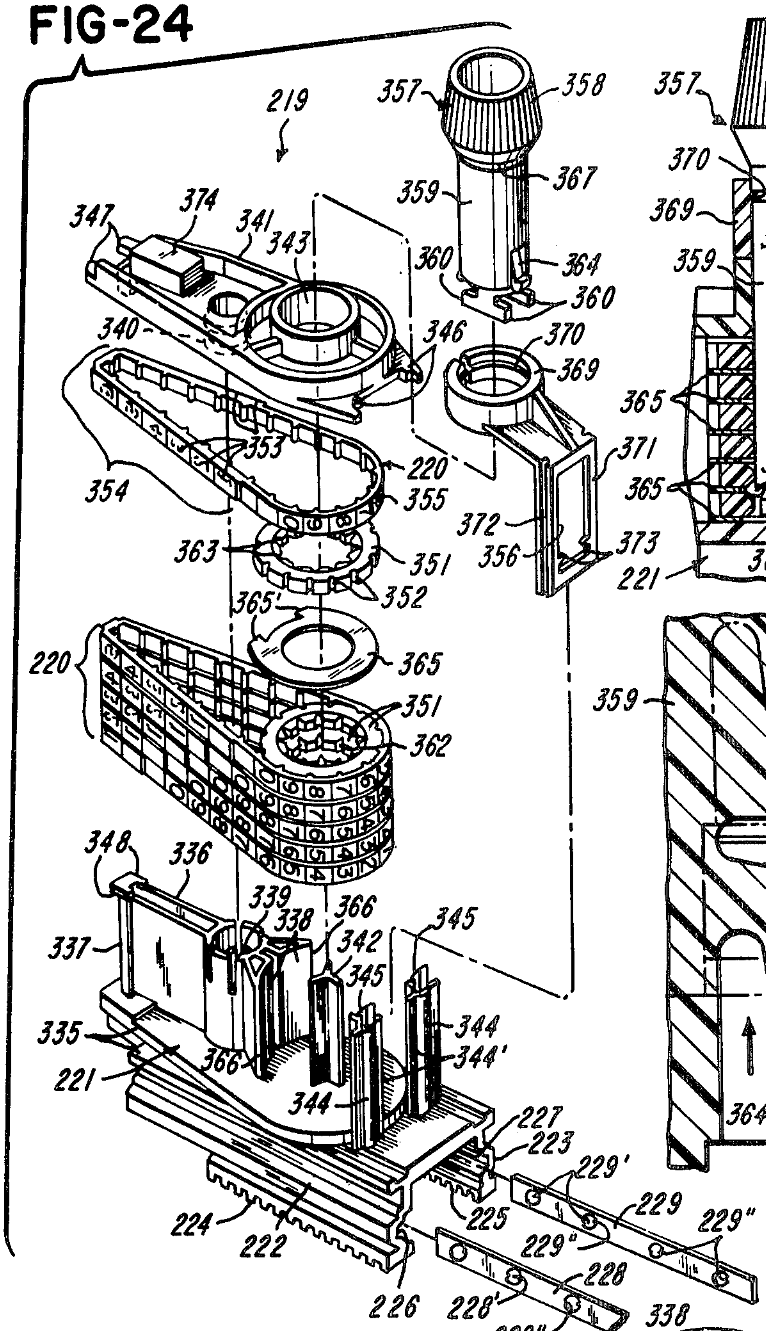
FIG-26
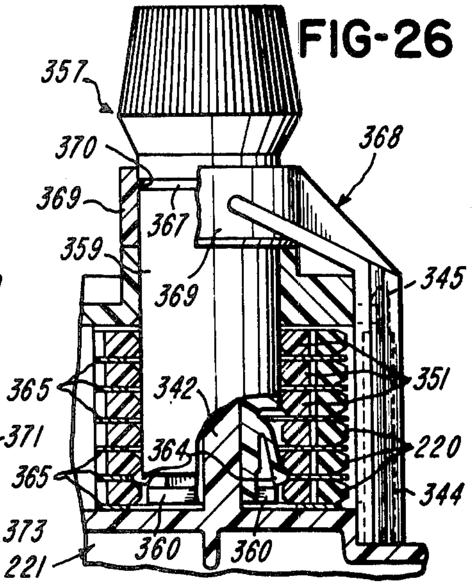
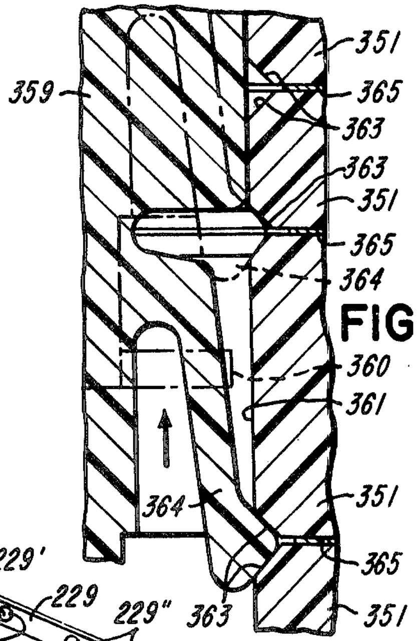
FIG-27
FIG-25
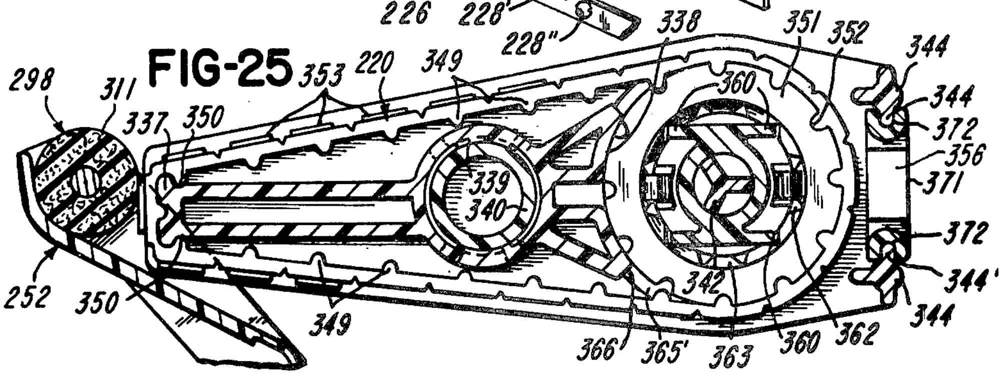

FIG-32
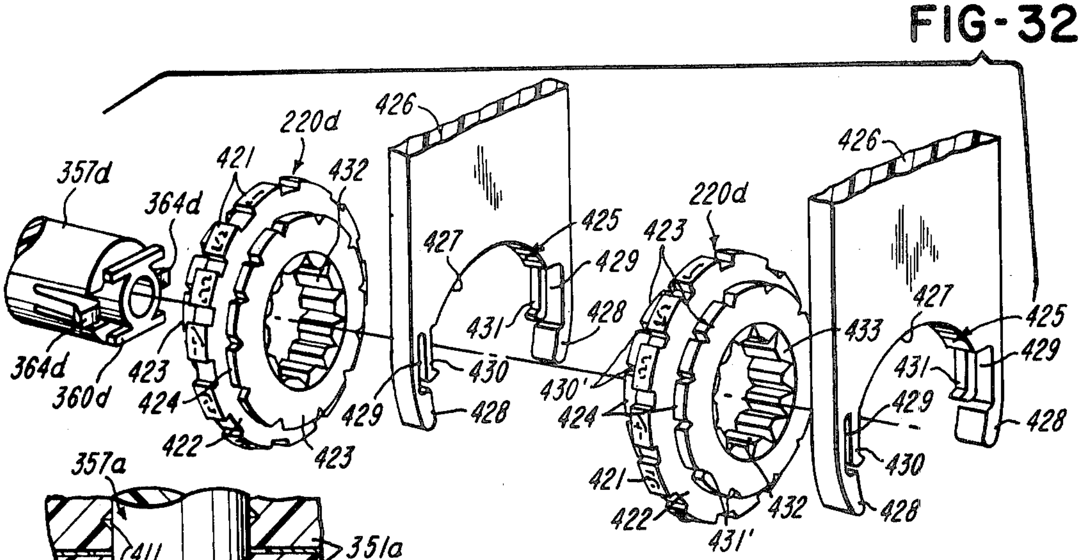
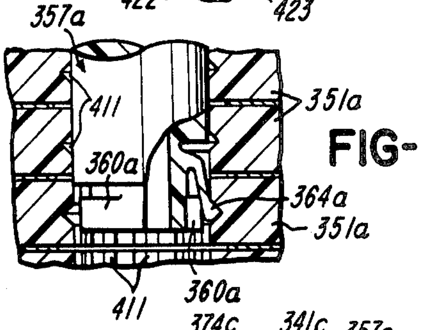
FIG-28
FIG-33
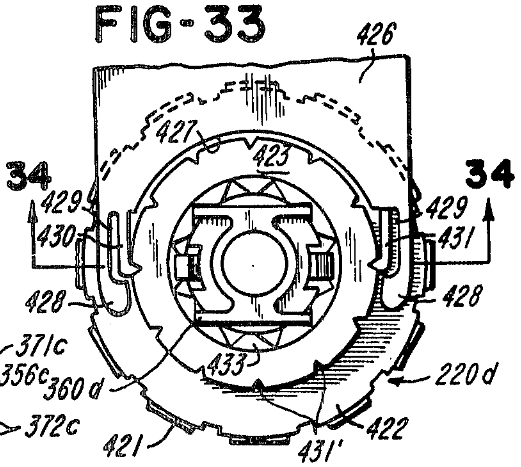
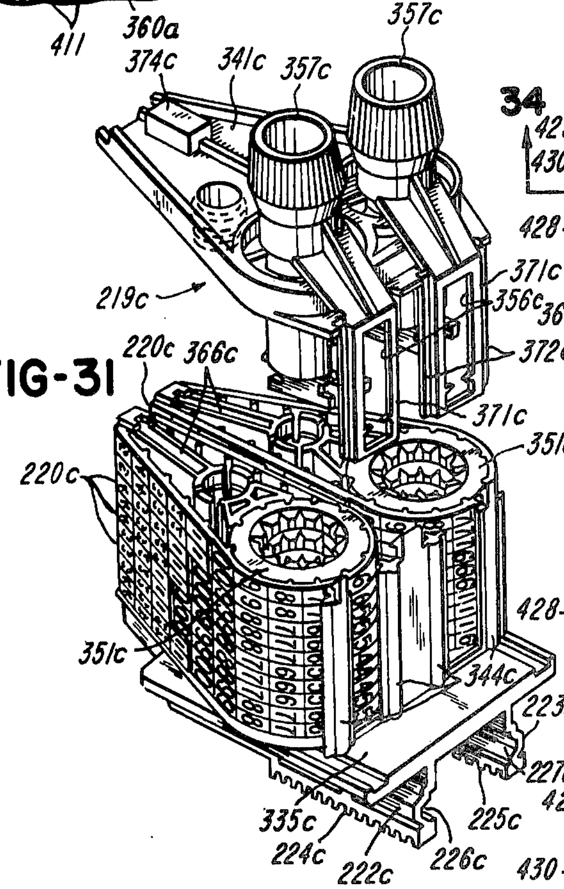
FIG-31
FIG-34
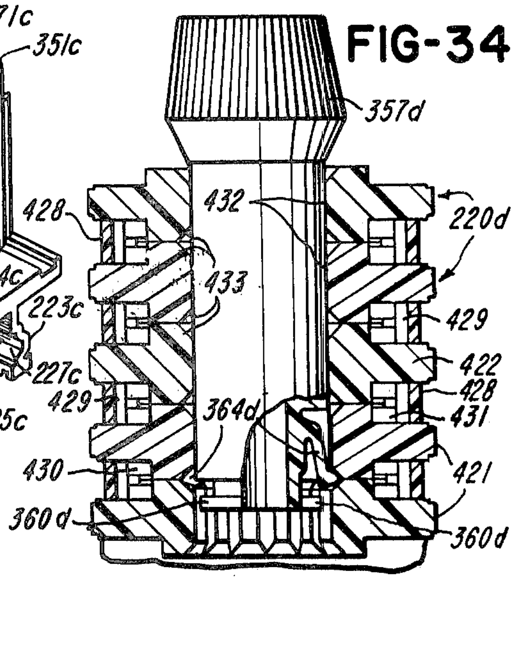

FIG-36
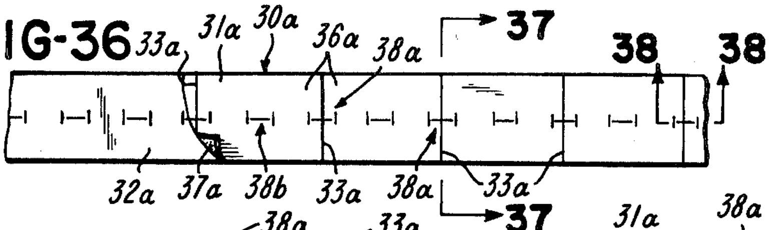
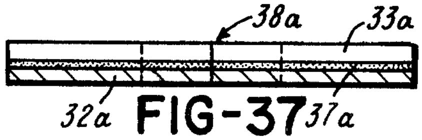
FIG-37
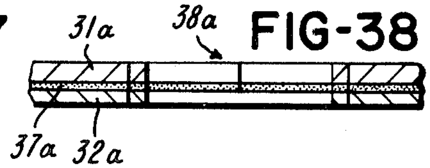
FIG-38
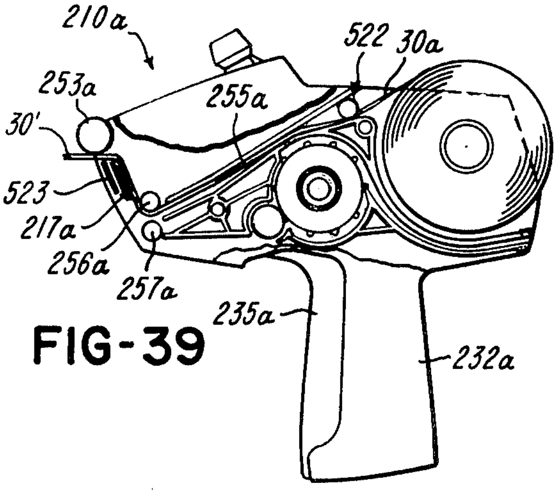
FIG-39
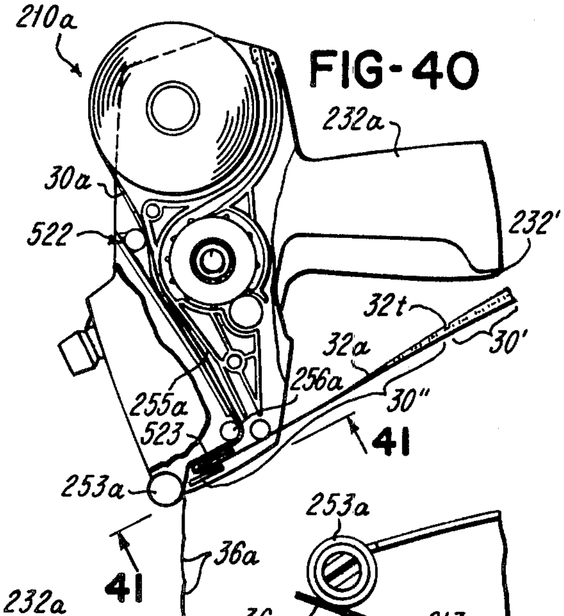
FIG-40
FIG-41
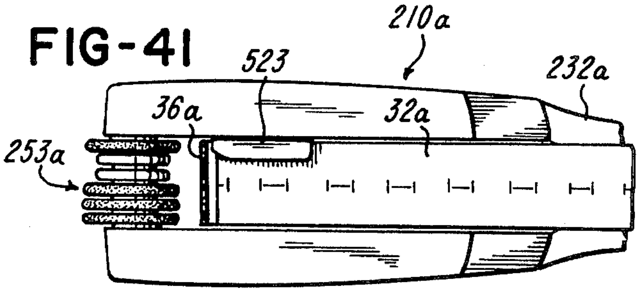
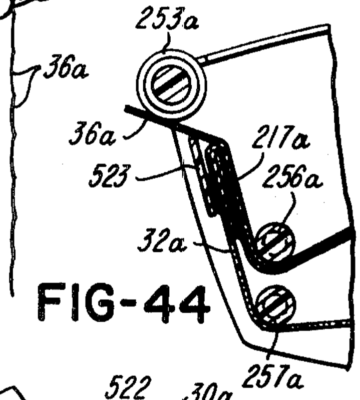
FIG-44
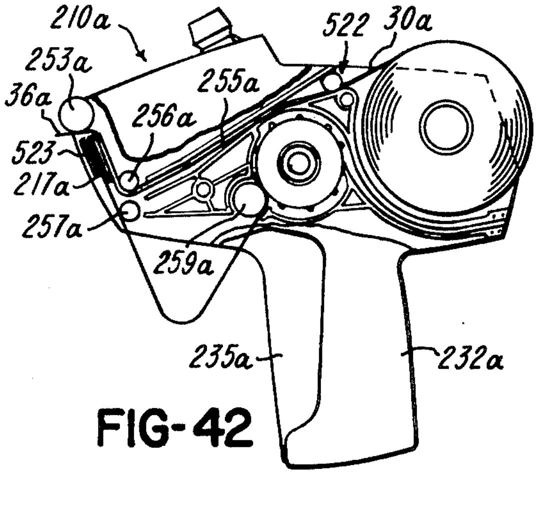
FIG-42
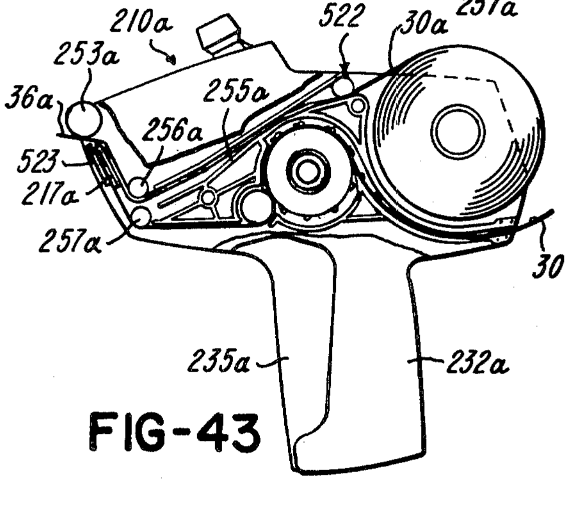
FIG-43

FIG-45
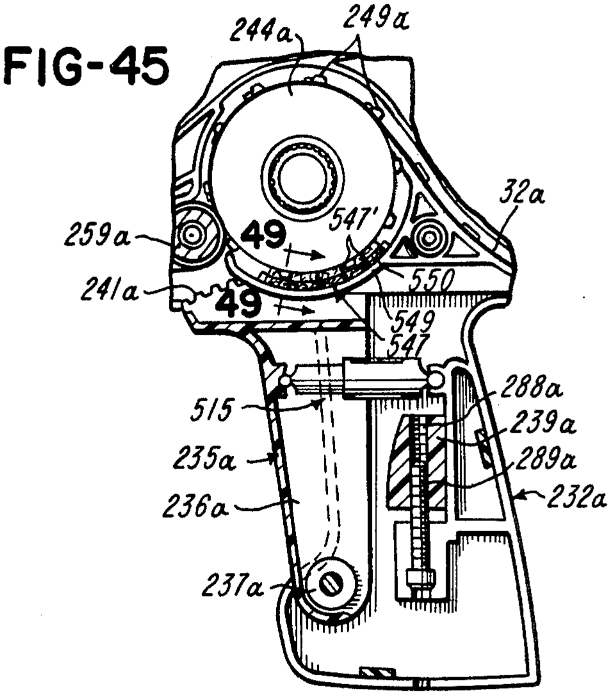
FIG-46
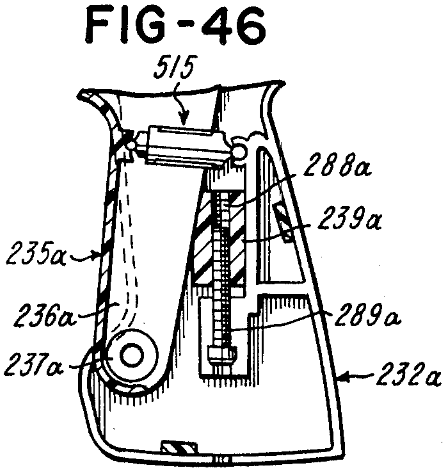
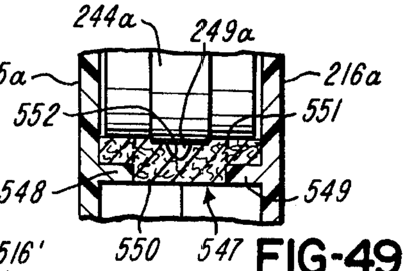
FIG-49
FIG-47
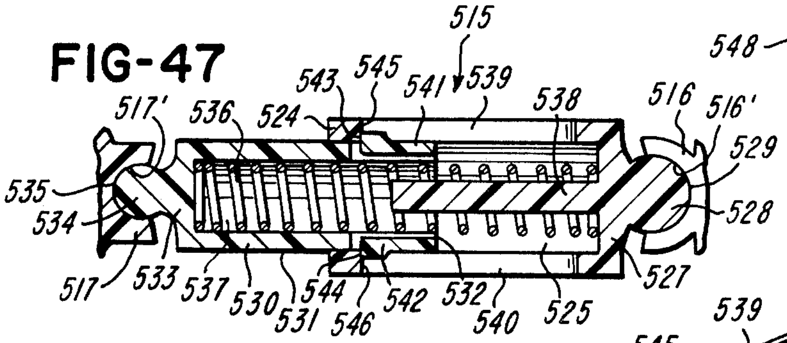
FIG-48
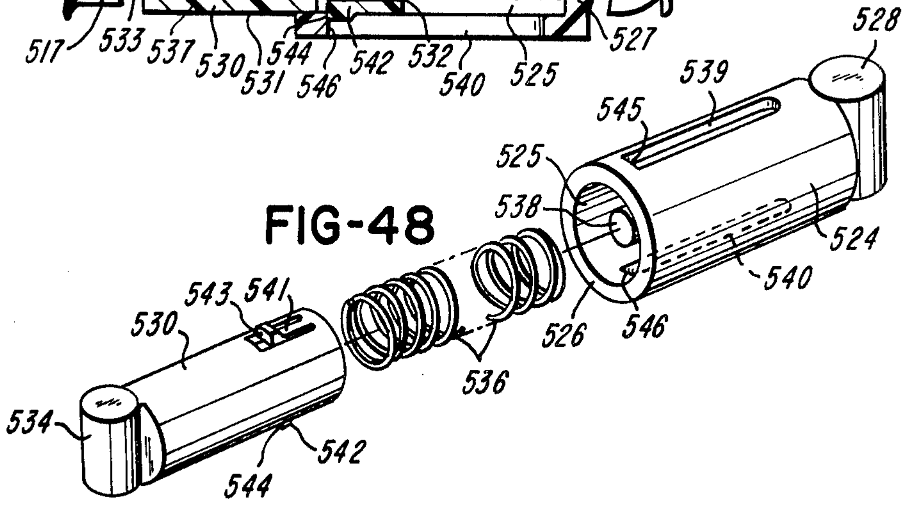

FIG-65
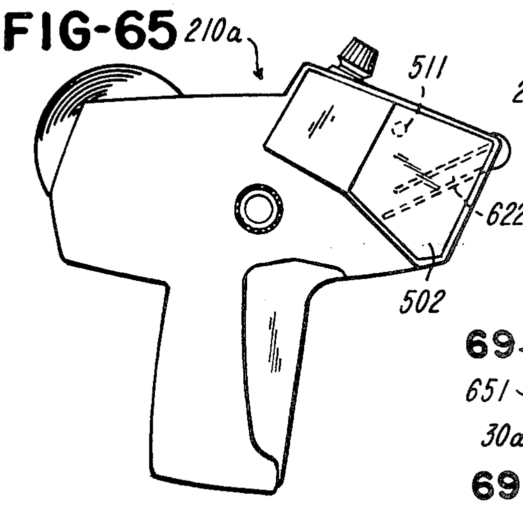
FIG-66
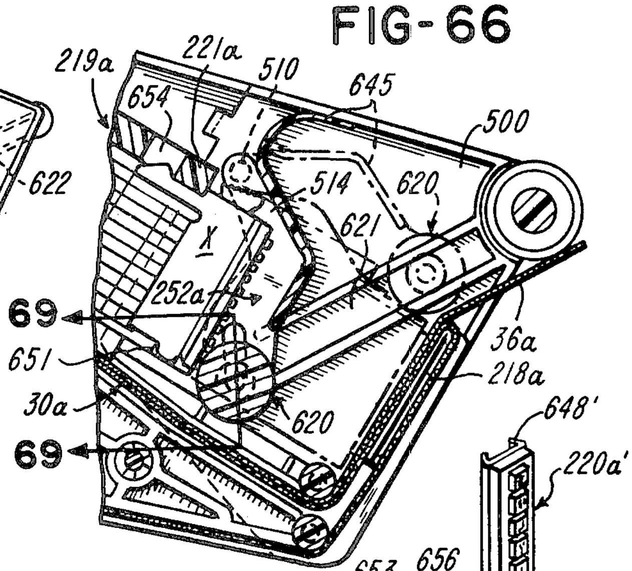
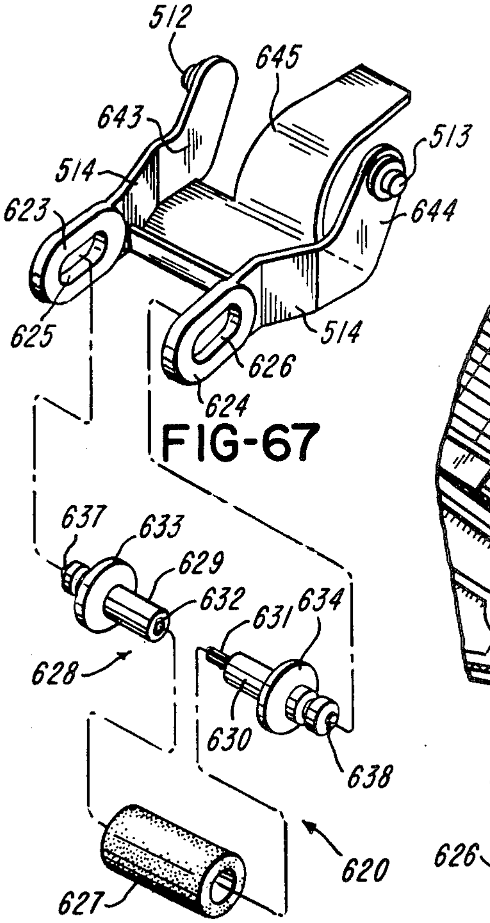
FIG-67
FIG-68
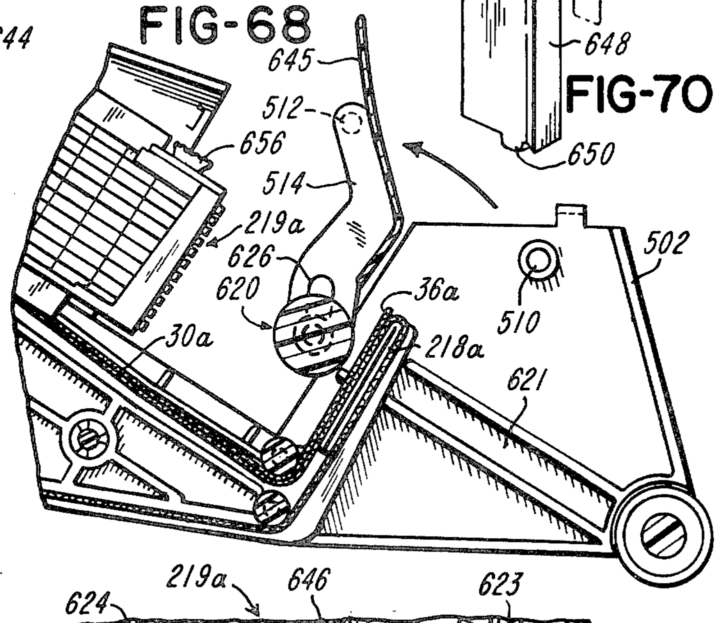
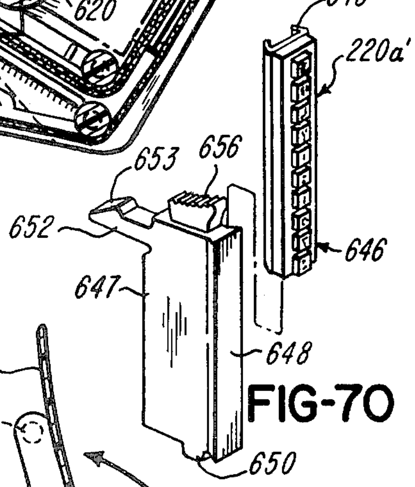
FIG-70
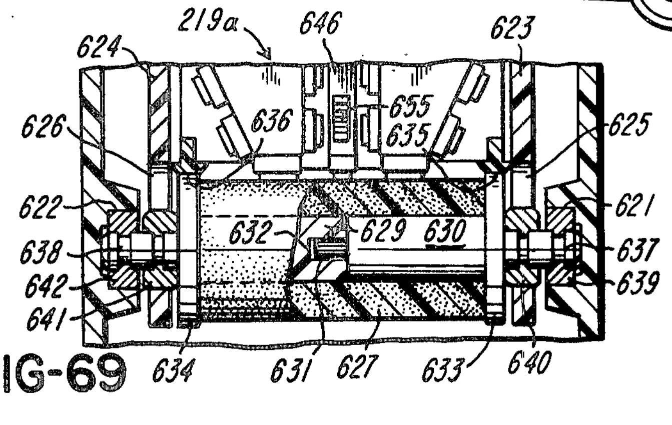
FIG-69

FIG-71
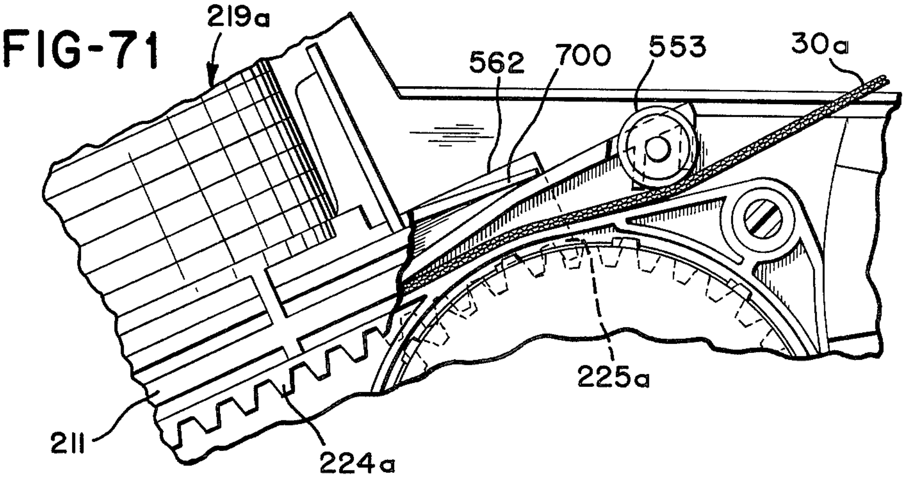
FIG-73
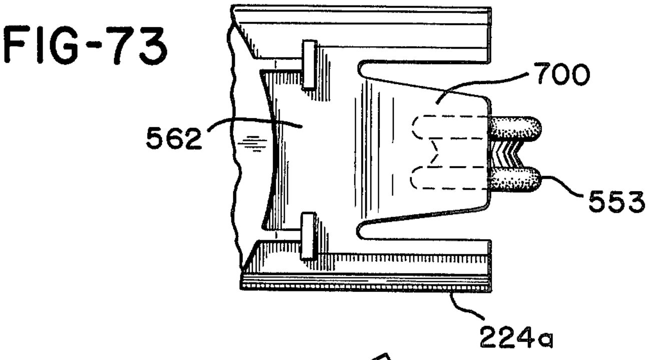
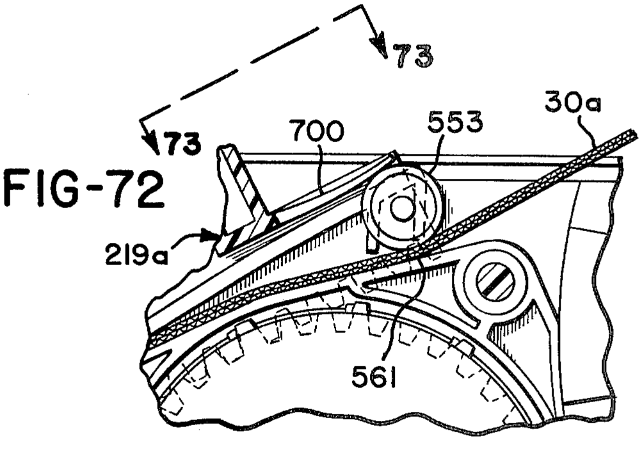
FIG-72

LABEL PRINTING AND APPLYING APPARATUS

CROSS-REFERENCE TO RELATED APPLICATIONS

This is a continuation-in-part of application Ser. No. 449,111, filed Mar. 7, 1974, now abandoned, which is a division of copending patent application Ser. No. 312,454 filed Dec. 6, 1972, now U.S. Pat. No. 3,968,745 granted July 13, 1976, which is a continuation-in-part of patent application Ser. No. 208,035, filed Dec. 8, 1971, now abandoned. Certain subject matter disclosed in the present application is claimed in U.S. application Ser. No. 205,854, filed Dec. 8, 1971, now U.S. Pat. No. 3,798,106 and U.S. application Ser. No. 206,061, filed Dec. 8, 1971, now U.S. Pat. No. 3,783,083, and which are assigned to the same assignee as the present application.

BACKGROUND OF THE INVENTION

1. Field of the Invention

This invention relates to the art of label printing and applying machines.

2. Brief Description of the Prior Art

Various U.S. Pat. Nos. 1,642,387, 2,259,358, 2,275,064, 2,502,257, 2,516,487, 2,620,205, 2,656,063, 3,051,353, 3,265,553, 3,343,485, 3,440,123, 3,501,365, 3,551,251 and 3,611,929 are made of record.

SUMMARY OF THE INVENTION

It is a feature of the invention to provide an apparatus for printing and applying labels, in which a composite web of labels is carried in roll form and in which labels are successively printed by printing means and the printed labels are substantially delaminated by delaminating means and are applied by applying means. In the event the labels in the composite web are not completely separated from each other, application of one label will cause an excessive amount of the composite web to be paid out of the roll, thereby causing some loss of registration in the printing of the next successive label. It is known in the art to apply braking force to the composite web upstream of the delaminating means to prevent excessive amounts of composite web from being paid out of the roll, but such brakes involve linkages which are relatively costly and complicated. By controlling a brake directly from the print head the brake structure is relatively simple in construction, yet automatic in operation. The invention also includes a resilient device for contacting the composite web downstream of the place the composite web is paid out of the supply roll and upstream of the means for applying braking force to the composite web, the device being resiliently yieldable during operation of the feeding means and subsequently returnable to effect gradual paying out of the composite web from the roll. In accordance with one embodiment, a first brake means applies a braking force to the core of the label roll and a second brake means applies a braking force to the composite web downstream of the first brake means and upstream of the delaminator upon completion of the sequence of operation of the apparatus. In accordance with one of the embodiments, the second brake means includes a resiliently urged member in the form of a spring finger or a leaf spring carried by the print head and a cooperable roll. The composite web passes between the roll and a member which cooperates with the roll. When a print head is moved from an initial position into printing cooperation with a platen, the resiliently urged member is moved out of cooperation with the roll and remains out of cooperation with the roll until the print head has essentially entirely returned to its initial position. The composite web is advanced following cooperation of the print head and the platen until the brake becomes effective at the end of the sequence of operation of the apparatus. The resiliently urged member assures that the second brake means is effective in spite of manufacturing variations in constructing the apparatus.

BRIEF DESCRIPTION OF THE DRAWINGS

FIG. 14 is an enlarged sectional view showing a fragmentary portion of the apparatus in solid lines, and in particular showing a fragmentary portion of the print head and the inking mechanism in both solid and phantom line positions;

FIG. 15 is a sectional view taken along line 15—15 of FIG. 4;

FIG. 16 is a developed view showing the arrangement of the teeth of the detent mechanism;

FIG. 17 is a sectional view taken along line 17—17 of FIG. 15;

FIG. 18 is a sectional veiw taken generally along line 18—18 of FIG. 15;

FIG. 19 is a sectional view showing one of the three sets of snap-fit connections used to interconnect the frame and the subframe;

FIG. 20 is an enlarged view of an applicator roll shown mounted in the frame of the apparatus;

FIG. 21 is a sectional view taken along line 21—21 of FIG. 20;

FIG. 22 is a sectional view taken along line 22—22 of FIG. 21, but omitting the shaft and the frictional member;

FIG. 23 is a partly sectional view of the mounting shaft which forms part of the applicator roll;

FIG. 24 is an exploded perspective view of the print head;

FIG. 25 is a sectional view of the print head taken generally along line 25—25 of FIG. 3;

FIG. 26 is a sectional view showing the selector in relationship to the associated driven wheels;

FIG. 27 is an enlarged sectional view showing the manner in which detenting of the selector is effected, but showing the driven members as being of different widths;

FIG. 28 is a view similar to a fragmentary portion of FIG. 26, but showing the manner in which detenting can be effected directly on a wheel;

FIG. 29 is an enlarged, partly sectional, elevational view showing an alternative arrangement for constructing the selector;

FIG. 30 is a perspective view showing the driving member depicted in FIG. 29;

FIG. 31 is a partly exploded perspective view of a modified print head in accordance with the invention;

FIG. 32 is an exploded perspective view of the selector in association with type wheels and mounting structure for the type wheels;

FIG. 33 is an end elevational view of the type wheels and the selector assembled in the mounting members;

FIG. 34 is a sectional view taken generally along line 34—34 of FIG. 33;

FIG. 36 is a partly broken away top plan view of a composite web useful in the apparatus;

FIG. 37 is a sectional view taken along line 37—37 of FIG. 36;

FIG. 38 is a sectional view taken along line 38—38 of FIG. 36;

FIGS. 39 through 44 are diagrammatic views illustrating a method of loading the apparatus;

FIG. 45 is an elevational view, partly in section, showing a fragmentary portion of the actuating means including an operator and a spring assembly, with the operator being in its initial position;

FIG. 46 is an elevational view, partly in section, showing the operator in its operated position;

FIG. 47 is an enlarged sectional view of the spring assembly;

FIG. 48 is an exploded perspective view of the spring assembly;

FIG. 49 is a sectional view taken generally along line 49—49 of FIG. 45;

FIG. 65 is a side elevational view of the apparatus;

FIG. 66 is a fragmentary partly sectional view of the apparatus showing a housing section in the closed position and showing the inking mechanism;

FIG. 67 is an exploded perspective view of an inker body and ink roller of the inking mechanism;

FIG. 68 is a view similar to FIG. 66, but showing the housing section in the open position;

FIG. 69 is a fragmentary view showing the ink roller bearing on the print head and inking the printing member;

FIG. 70 is a perspective exploded view of a slug used with the print head;

FIG. 71 is a partly broken away fragmentary elevational view similar to FIG. 52, but showing an alternative embodiment, with the brake being in its ineffective position;

FIG. 72 is a view similar to FIG. 71, but showing the brake in its effective position; and FIG. 73 is a view taken along line 73—37 of FIG. 72 with certain parts omitted for clarity.

DESCRIPTION OF THE PREFERRED EMBODIMENTS

Figure 1:
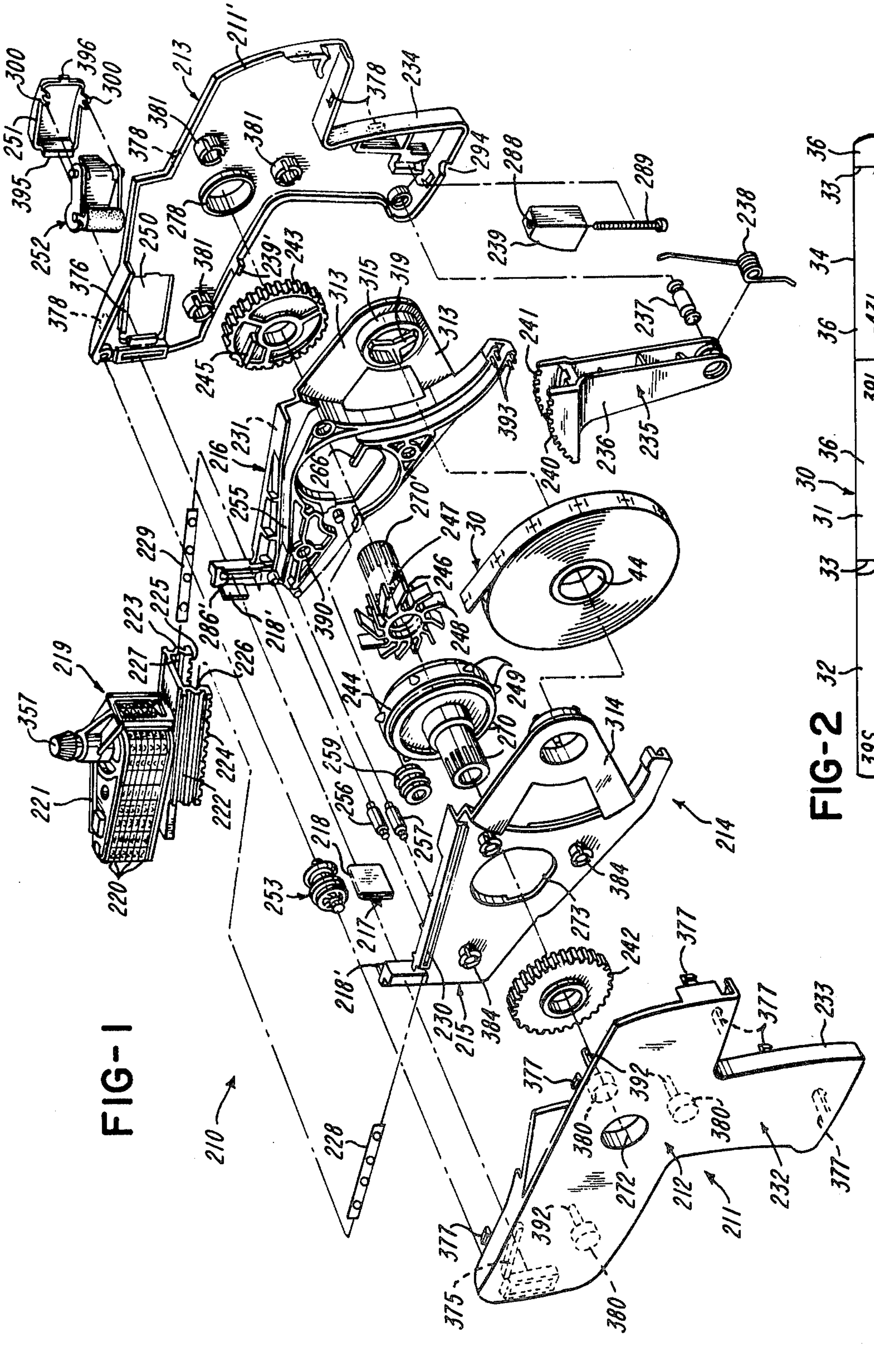
FIG. 1 is an exploded perspective view of label printing and applying apparatus for carrying out the method of the invention.

Referring now to a label printing and applying apparatus generally indicated at 210 in the embodiment of FIGS. 1 through 27, and initially to FIG. 1, there is shown to be a housing or main frame generally indicated at 211. The housing or frame 211 is specifically shown to include a pair of frame sections 212 and 213. Disposed within the housing 211 is a subframe generally indicated at 214 which comprises a pair of subframe sections 215 and 216. The frame sections 212 and 213 mount a platen 217 which includes a peel edge 218. A print head generally indicated at 219 is mounted by the subframe 214. More specifically, the print head 219 includes a plurality of selectable settable printing members 220 in the form of endless printing bands mounted by a print head frame 211. Extending from the frame 221 are a pair of flanges 222 and 223. Gear sections or specifically racks 224 and 225 are provided at the ends of the respective flanges 222 and 223. Opposed tracks 226 and 227 are formed on the respective flanges 222 and 223 to receive straight ball bearings 228 and 229. The subframe sections 215 and 216 have respective tracks 230 and 231. The ball bearing 228 is received in the track 226 of the flange 222 and in the track 230, and the ball bearing 229 is received in the track 227 in the flange 223 and in the track 231. The ball bearings 228 and 229 have respective balls 228' and 229' rotatably held by respective tangs or holders 228" and 229". In this manner, the print head 219 is mounted for movement, particularly reciprocating movement, toward and away from the platen 217.

The housing 211 has a handle generally indicated at 232 and particularly each housing or frame section 212 and 213 has a respective handle portion 233 and 234. An operator generally indicated at 235 is shown to comprise a pivotally operated lever 236 pivotally mounted by a post 237 at the lower end of the handle 232. The lever 236 is normally urged in a counterclockwise direction (FIG. 1) by a torsion spring 238 received about the post 237. The pivotal movement of the lever 236 is limited by an adjustable stop block 239 received by the handle 232 between the handle portions 233 and 234. The upper end of the operating lever 235 carries a pair of spaced-apart gear sections 240 and 241. The gear sections 240 and 241 are shown to be in the form of spur gear segments. Gear sections 240 and 241 are in meshing engagement with respective spur gears 242 and 243. The spur gears 242 and 243 are in meshing engagement with respective gear sections 224 and 225 carried by the print head 219.

Figure 2:
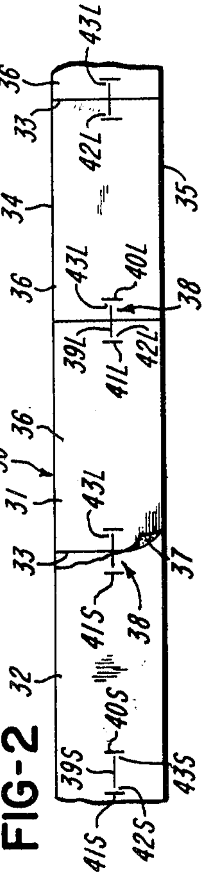
FIG. 2 is a partly broken away top plan view of a composite web useful in the label printing and applying apparatus of the invention.

A roll of pressure sensitive labels, in the form for example of the composite web 30 shown in FIG. 2, is mounted by its core 44 by the subframe 214. As will be described in greater detail hereinafter, the composite web 30 is drawn off the roll into overlying relationship with respect to the platen 217 and the supporting material 32 is engaged by a toothed driver 244. The gear 243 carries an integral pawl 245 cooperable with a ratchet wheel 246 which is coupled to the driver 244 by a detent mechanism generally indicated at 247. An input or drive member 248 of the detent mechanism 247 is shown in FIG. 1. The toothed driver 244 has a plurality of equally spaced apart drive teeth 249 arranged about its outer periphery. The pawl 245 is integrally joined at but one end to the gear 243. The pawl 245 is flexible and resilient and can ride on the ratchet wheel 246 and deflect into engagement with a tooth 265 of the ratchet wheel 246.

The housing or frame section 213 has an access opening 250. A cover 251 is removably connected to the frame section 213 at the access opening 250. The cover 251 mounts an inking mechanism 252 cooperable with the printing members 220 of the print head 219. The housing sections 212 and 213 mount an applicator 253 disposed downstream of the peel edge 218.

Referring to FIG. 2, there is shown composite web 30 of label material 31 releasably adhered to and carried by supporting or backing material 32. The label material 31 is cut transversely by transverse cuts 33 extending all the way across the web 31 of label material to the side edges 34 and 35 of the composite web 30. The cuts 33 known as "butt cuts" separate the web 31 of label material into a series of end-to-end labels 36. The underside of the web 31 of label material has a coating of pressure sensitive adhesive 37 which adheres strongly to the web 31 of label material. The web 32 of supporting material carries a thin film or coating (not shown) which allows the labels to be peeled from the web 32 of supporting material.

Groups 38 of cuts are provided at equally spaced-apart intervals along the length of the composite web 30. Each group 38 of cuts is shown to extend through the supporting material as well as through the label material. Each group of cuts is shown to be made in a generally I-shaped configuration comprised of cuts 39S, 40S and 41S in the supporting material and aligned cuts 39L, 40L and 41L in the label material. The part of the web 32 between the one end of the cut 39S and the cut 40S provides a frangible portion 43S and the part of the web 32 between the other end of the cut 39S and the cut 41S provides frangible portion 42S. In like manner, the part of the label material between the end of the cut 39L and the cut 40L provides a frangible portion 43L and the part between the other end of the cut 39L and the cut 41L provides a frangible portion 42L.

Figures 3, 4, 5, 6, 13:
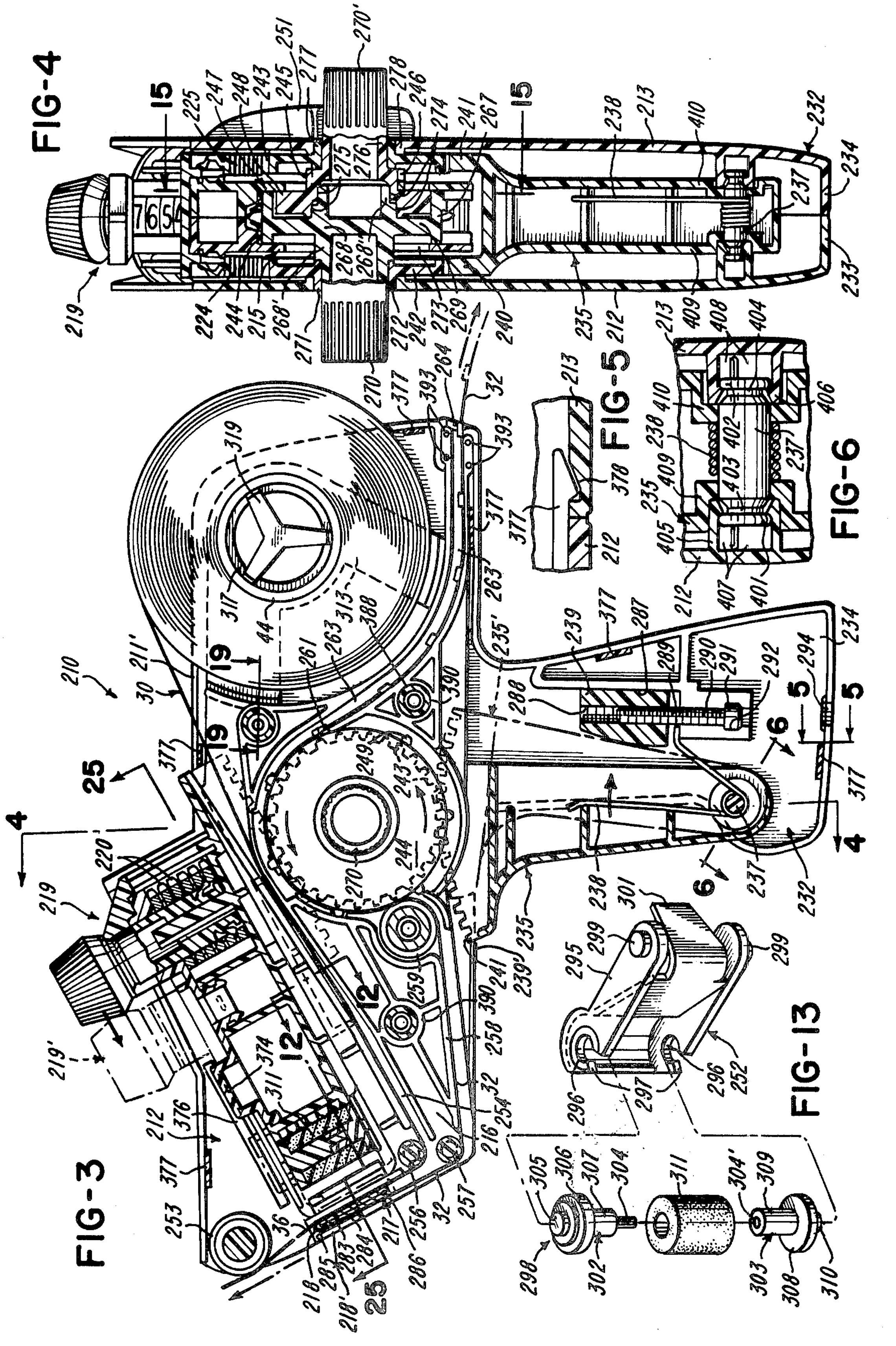
FIG. 3 is a sectional elevational view of the apparatus shown in FIG. 1.
FIG. 4 is a sectional view taken generally along line 4—4 of FIG. 3.
FIG. 5 is a sectional view taken along line 5—5 of FIG. 3.
FIG. 6 is a sectional view taken along line 6—6 of FIG. 3.
FIG. 13 is an exploded perspective view of the inking mechanism.

Referring to FIG. 3, the interrelationship of the components of the apparatus 210 is shown in detail. The composite web 30 is paid out of the roll and passes through a passage provided by subframe sections 215 and 216 and specifically by groove 254 (FIG. 9) in the subframe section 215 and a cooperating groove 255 (FIGS. 1, 3 and 7) in the subframe section 216. From there the composite web 30 passes partly around a roll 256 and into overlying relationship with the platen 217. Delamination is effected at the peel edge 218 formed at the end of the platen 217. The supporting material 32 is drawn around the peel edge 218 beneath the platen 217 and passes partly around a roll 257, below the guide 258 and between the toothed driver 244 and the mating die wheel 259. As a tooth 249 moves into mating cooperation with the die wheel 259, the tooth 249 engages the supporting material 32 at the longitudinal cut 39S and effects rupturing or bursting of the frangible portions 42S and 43S, whereupon the tooth 249 which is in mating cooperation with the die wheel 259 (FIG. 18) is considered to have formed a feed hole in the supporting material 242. It is preferred that there be three teeth 249 in driving engagement with the supporting material 32 at all times. The subframe sections 215 and 216 have respective aligned strippers 260 and 261 which facilitate disengagement of the teeth 249 with the supporting material 232 as the driver 244 rotates. Opposed guide grooves 262 and 263 formed in the subframe sections 215 and 216 guide the supporting material 32 to an exit opening 264. Excess supporting material which dangles from the apparatus 210 can be readily torn off at the exit opening 264.

With reference to FIG. 3, the print head 219 is shown by solid lines in the initial or home position and by phantom lines 219' in the printing zone in printing cooperation with the label 36 and the platen 217. The operator 235 is shown by solid lines in its initial or home position and in phantom lines 235' in the fully actuated position. In the fully actuated position, the print head 219 has been moved into printing cooperation with the labels 36 and the platen 217, and the operator 235 is in abutment with the stop block 239. In this position of the operator 235, the flexible resilient pawl 245 (FIG. 15), joined integrally at one end to the gear 243, has moved to the position shown by phantom lines 245' in driving cooperation with a tooth 265 of the ratchet wheel 246. When the user releases the operator 235, the spring 238 (FIG. 3) returns the operator 235 against stop 239' to the solid line position shown in FIG. 3. While the operator 235 is returning to the solid line position from the fully actuated position indicated by phantom lines 235', the gear sections 240 and 241 (FIGS. 3 and 4) rotate gears 242 and 243 clockwise (FIG. 3) to return the print head 219 to the solid line position from the position shown by solid lines 219', and to drive the pawl 245 from the position shown by phantom lines 245' to the position shown in solid lines in FIG. 15. Thus, the pawl 245, which is in line position from the fully actuated position indicated by phantom lines 235', the gear sections 240 and 241 (FIGS. 3 and 4) rotate gears 242 and 243 clockwise (FIG. 3) to return the print head 219 to the solid line position from the position shown by solid lines 219' and to drive the pawl 245 from the position shown by phantom lines 245' to the position shown in solid lines in FIG. 15. Thus, the pawl 245, which is in engagement with a tooth 265, drives the ratchet wheel 246 counterclockwise (FIG. 15). This counterclockwise rotation of the ratchet wheel 246 (FIG. 15) causes the driver 244 to advance the supporting material 32 to effect substantially complete delamination of a label at the peel edge 218. Counterclockwise rotation of the ratchet wheel 246 continues until a pawl 266 (FIGS. 1, 7 and 15) in the form of a flexible resilient appendage of the subframe section 216, moves into engagement with a tooth 265 of the ratchet wheel. This prevents the web of supporting material 32 from being accidentally moved in the return direction.

As best shown in FIG. 4, the driver 244 has an annular rim 267 joined to a hub 268 by a radial web 269. The hub 268 has a hub section 268' extending in one direction and another hub section 268" extending in the opposite direction. The hub section 268' terminates at a knob 270, and the hub section 268" terminates at a knob 270'. The gear 242 is rotatably journaled on and with respect to the hub section 268'. The gear 242 has a hub or flange 271 which is rotatably journaled in opening 272 in the frame section 212. The hub section 268' extends through an enlarged opening 273 in the subframe section 215. The hub section 268" provides a stepped pair of bearing surfaces 274. The ratchet wheel 246 is formed integrally with the drive member 248 of the detent mechanism 247. The ratchet wheel 246 and the drive member 248 have a hub 276 with a stepped bore 275 into which the hub section 268" extends. A hub 276 rotatably receives and mounts the gear 243. The gear 243 has a hub 277 rotatably received in a bearing 278 formed integrally with the housing section 213. As seen in FIG. 4, the gears 242 and 243 are in driving engagement with respective gear sections 224 and 225 carried by the print head 219; the relative position of the drive pawl 245 to the ratchet wheel 246 is also shown.

With reference to FIG. 15, the drive member 248 includes a plurality of spring fingers or detent pawls 278. The pawls 278 are of equal length, are flexible and resilient, and are continuously urged against teeth 279 formed on the inside of the annular rim 267. In the illustrated embodiment there are one hundred and seventy-seven teeth 279 at equally spaced-apart intervals. There are twelve pawls 278 integrally connected to the hub 276 at equally spaced-apart intervals. The teeth 279 comprise respective tooth faces 280 and a recess between adjacent tooth faces 280 in which the end of a pawl 278 can be received. The pawls 278 drive the feed wheel 244 in a driving direction (counterclockwise in FIG. 15) but can move in a non-driving direction (clockwise in FIG. 15) relative to the feed wheel 244 by manually operating the detent mechanism 247. Accordingly, every fifth pawl 278 is engaged with the face 280 of a tooth 279. The pawls 278 between every fifth set of pawls are out of engagement with their respective tooth faces 280 by different increments as best illustrated in FIG. 16. Normally, the pawls 278 hold the ratchet wheel 246 and the feed wheel or driver 244 in fixed relationship with respect to each other. With reference to FIG. 15, as the drive pawl 245 moves counterclockwise the ratchet wheel 246 is driven counterclockwise and the three pawls 278 which are in driving engagement with their respective tooth faces 280 will drive the feed wheel 244 counterclockwise. Accordingly, there is no relative rotation between the ratchet wheel 246 and the feed wheel 244. Should it be desired to change the position to which the labels are advanced by the feed wheel 244 upon actuation of the operator 235, the user will grasp the knobs 270 and 270' and will rotate the knob 270' counterclockwise (FIG. 1) relative to the knob 270. This will cause the input member 248 to rotate (counterclockwise in FIG. 1, clockwise in FIG. 15) relative to the feed wheel 244 so that the next three successive teeth move into engagement with the next three respective tooth faces 280. For example, if it is considered that first, fifth and ninth pawls 278 were initially in engagement with respective teeth 279, only a very slight rotation will cause second, sixth and tenth pawls to move into engagement with their respective tooth faces 280, and so on. Although any desired number of pawls 278 and teeth 280 can be used, the illustrated embodiment provides very minute adjustment of the feed wheel 244 relative to the platen 217 and the peel edge 218 and the arrangement of teeth 280 and cooperating pawls 278 causes the entire input or drive member 248 to be centered within the annular rim 267. With respect to the printing function, adjustment of the detent mechanism 247 changes the position relative to the printing zone between the print head 219 and the platen 217 to which a label 36 is advanced. With respect to the delaminating function, operation of the detent mechanism 247 also changes the position to which the label 36 is advanced. Accordingly, it is apparent that the detent mechanism 247 is useful both in establishing the position to which a label is advanced relative to the printing zone and to the delaminating zone. It is important that just the correct amount of trailing marginal end edge of the label remain adhered to the peel edge so that the label 36 is held in that position until it is ready to be applied to merchandise by the applicator 253.

As best shown in FIGS. 15, 17, and 18, the supporting material 32 is initially brought into engagement with the feed wheel 244 as it passes around the die wheel 259. The die wheel 259 is comprised of an annular plastic roll 281 journaled by subframe sections 215 and 216. The roll 281 has frictional members in the form of rubber O-rings 282 received at spaced-apart locations about the periphery of the roll 281. The O-rings straddle the teeth 249 and are just spaced apart far enough to act as a die wheel with mating teeth 249. As a tooth 249 begins to engage the web of supporting material 32 at the cut 39S (FIG. 2), the die wheel 259 cooperates with the tooth 249 to hold the supporting material 32 on each side of the group 38 of cuts in intimate contact with the outer surface of the feed wheel 244 as best shown in FIG. 18. This insures that the tooth 249 properly bursts or forms a hole, facilitated by the group 38 of cuts, in the supporting material 32 and that the drive face of the tooth 249 is in driving engagement with the leading cut 41S. When the first tooth 249 registers with the group 38 of cuts in the supporting material 32 the composite web 30 is properly registered with the printing zone and the delaminating zone. Once such registration is accomplished as the result of the tooth 249 cooperating with the die roll 259, correct registration continues.

The platen 217 and the peel edge 218 (FIGS. 1, 3 and 4) are formed from an inversely-bent plate having a pair of side-by-side plate portions 283 and 284 joined by an inversely-bent portion 285. The inversely-bent portion 285 has a small radius and defines the peel edge 218. The plate portions 283 and 284 are co-extensive and are secured to each other by weldments 286. The plate which forms the platen 217 and the peel edge 218, received in recesses 286′ in subframe sections 215 and 216, is preferably constructed of highly polished stainless steel. The sides of the plate that forms the platen 217 and the peel edge 218 are received in opposed recesses 286′ in the subframe sections 215 and 216. A label stopper is provided by a pair of aligned plates 218′ formed integrally with the subframe sections 215 and 216. The plates 218′ are disposed beneath but are spaced from the plate 217. Should a label 36 attempt to fall onto the supporting material 32 after being delaminated at the peel edge 218, the labels 36 will be caught by the plates 218′. This will prevent any label 36 from continuing along the path through which the supporting material 32 passes after passing the peel edge 218.

With reference to FIG. 3, the stop block 239 is shown to be slidable on a stop surface 287. The stop block 239 has a threaded bore 288 which threadably receives an adjusted screw 289. One half of the screw 289 is rotatably received in a semi-circular groove 290 and one-half of the head 291 of the screw 289 is captive in a semi-circular recess 292 in the seat 293. The handle portion 233 of the frame section 212 provides another stop surface (not shown) for the stop block 239 in alignment with the stop surface 287, another semi-circular groove (not shown) opposite the groove 290 for receiving the other one-half of the screw 289, and another semi-circular recess (not shown) opposite the recess 292 for receiving the other one-half of the head 291. A hole 294, one-half of which is formed by each handle portion 233 and 234, enables entry of a tool (not shown) by which the head 291 of the screw 289 can be engaged to rotate the screw 289. Rotation of the screw in one direction will cause the stop block 239 to move upwardly (FIG. 3) and rotation of the screw 289 in the opposite direction will cause the stop block 239 to move downwardly (FIG. 3). It is apparent that adjustment of the position of the stop block 239 will adjust the limit of the travel of the operator 235.

With reference to FIG. 13, the inking mechanism 252 is shown to comprise a one-piece inker body 295 having an aligned pair of sockets 296 having converging openings 297. The sockets 296 extend for more than 180° so that the ink roll 298 can be snapped into the sockets 296. The inker body 295 has a pair of aligned projections 299 which are capable of being snapped into sockets 300 (FIG. 1) in the cover 251. The sockets 300 are shaped like the sockets 296. The inker body 295 has an integrally formed leaf spring or spring finger 301 which is shown in FIG. 14 to be urged against the cover 251. The spring finger 301 normally urges the inking mechanism 252 into the solid line position shown in FIG. 14. The ink roller 298 is shown in FIG. 14 to be in the path of but slightly spaced from the print head 219 because in that position the inker body 295 contacts the frame 221 of the print head 219. When the print head 219 is moved from the solid line position to the phantom line position, the ink roll 298 applies ink to the printing bands 220 and the entire inking mechanism 252 pivots about projections 299 to the position shown in phantom lines. When the print head 219 returns to the solid line position shown in FIG. 14, the spring finger 301 returns the inking mechanism 252 to the solid line position.

With reference to FIG. 13, the ink roller 298 is shown to comprise a pair of hub sections 302 and 303. The hub section 302 has an elongated projection 304 at one end and a stub end 305 at its opposite end. The hub section 302 has an annular flange 306 between the stub end 305 and a reduced portion 307. The reduced portion 307 is disposed between the flange 306 and the projection 304. The other hub portion 303 has an annular flange 308 disposed between a reduced portion 309 and a stub end 310. The reduced portion 309 has a bore 304′ into which the projection 304 is adapted to be press-fitted. The projection 304 has straight flutes which serve to lock the hub portions 302 and 303 together. An ink-receptive tubular porous roll 311, composed for example of rubber or the like, is received on the reduced portions 307 and 309 of respective hub sections 302 and 303. The flanges 306 and 308 abut the ends of the roll 311 and prevent the roll 311 from shifting.

Figure 7:
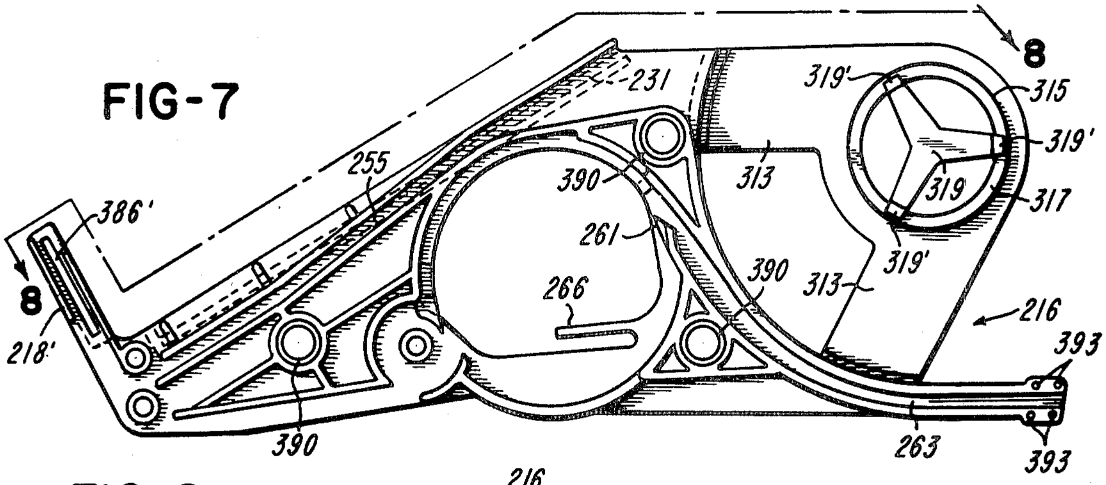
FIG. 7 is a side elevational view of one of the subframe sections of the apparatus.
Figure 8:
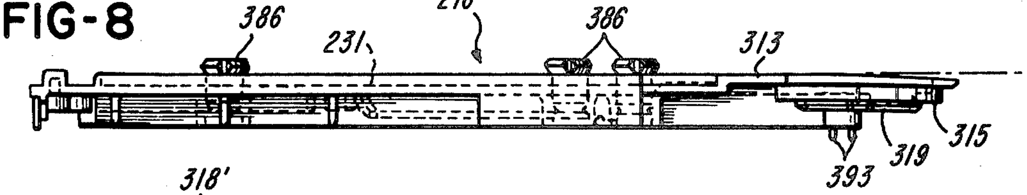
FIG. 8 is a top plan view taken along line 8—8 of FIG. 7.
Figure 9:
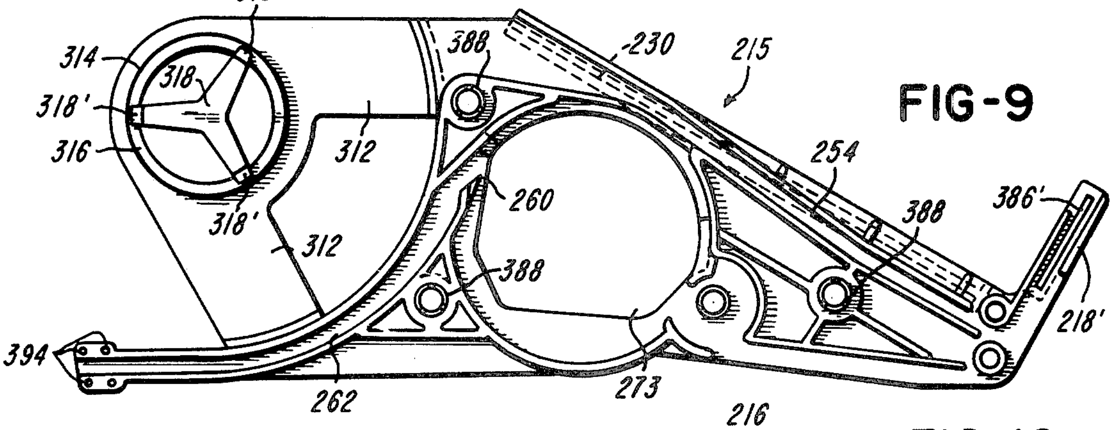
FIG. 9 is a side elevational view of the other subframe section.
Figure 10:
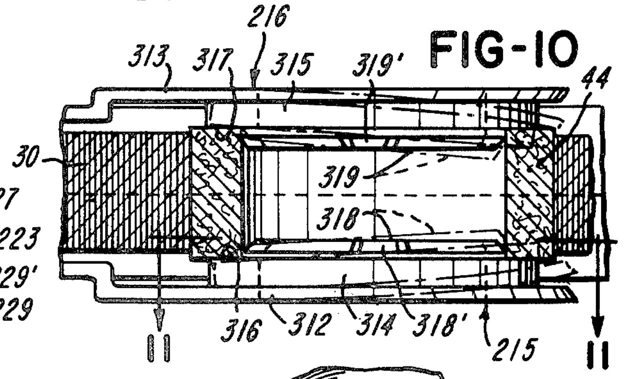
FIG. 10 is a top plan view showing the manner in which the label core for the roll of labels is held and the manner in which braking force is applied by the subframe sections.
Figure 11:
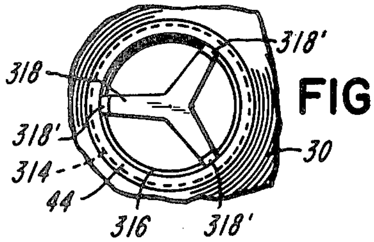
FIG. 11 is a sectional view taken along line 11—11 of FIG. 10.
Figure 12:
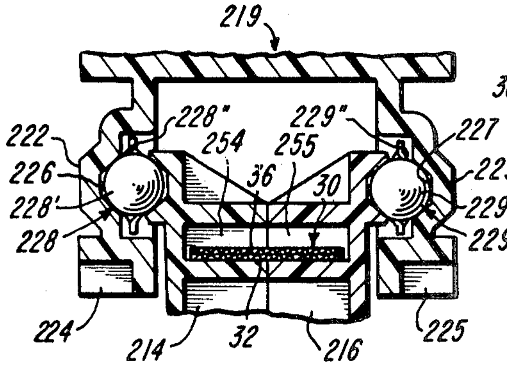
FIG. 12 is a sectional view taken generally along line 12—12 of FIG. 3.

With reference to FIGS. 7, 8 and 9, the subframe sections 215 and 216 are shown to have respective integral leaf springs 312 and 313. The leaf springs 312 and 313 are provided with integral annular brake members 314 and 315 having respective annular brake surfaces 316 and 317. Brake members 314 and 315 are formed integrally with projections or hubs 318 and 319, surfaces 318′ and 319′ of which are received in and mount label core 44. The brake surfaces 316 and 317 cooperate to exert braking forces on the label core 44. Neither the hubs 318 and 319 nor the brake members 314 and 315 contact the composite web 30 which is wound on the label core 44. In this manner, any gum or adhesive that may exist at the marginal side edges of the composite web 30 will not be transferred to the brake surfaces 316 and 317. FIG. 10 illustrates, in exaggerated form, by phantom lines, the initial positions of the leaf springs 312 and 313, the brake members 314 and 315 and the hubs 318 and 319. The initial canted position of the leaf springs 313, the brake members 315 and the hub 319 relative to the remainder of the subframe section 216 is also shown in FIG. 8. Insertion of the label core 44 onto the hubs 318 and 319 will cause the leaf springs 312 and 313 to flex outwardly and the brake surfaces 316 and 317 will exert a predetermined braking force on the ends of the core 44. The braking force applied to the core 44 will insure that there is tension in the web 32 of supporting material from the label roll to the printing zone, to the peel edge 218, and to the toothed driver 244. As the pawl 266 (FIG. 15) prevents the reverse rotation of the driver 244, it is seen that the apparatus maintains a slight but desirable amount of tension on the web of supporting material 32 at all times.

The frame 211 comprises an essentially closed shell but the rear part provides an access opening 211′ through which a roll of labels can be inserted and a spent core 44 can be removed without even partial disassembly of the apparatus 210.

With reference to FIGS. 20 through 23, there is shown the applicator 253 mounted by the frame 211. The applicator 253 comprises a hub 320 shown to have four annular generally V-shaped grooves 321 in which respective wheels 322 are rotatably mounted. The hub 320 also has a pair of annular flanges 323 disposed between the set of three wheels 322 and the remaining wheel 322. The wheels 322 have greater diameters than the flanges 323. The ends of the hub 320 beyond the grooves 321 are stub ends 324. Undercuts 325 inboard of the stub ends 324 enable the hub to be retained in cooperating yieldable sockets 326 and 327 in frame sections 212 and 213. The sockets 326 and 327 are comprised of a plurality of separate socket sections or flexible resilient fingers 328 and 329 to enable the stub ends 324 to be snapped into place. The sockets 326 and 327 and the cooperating stub ends 324 provide opposed snap-fit connections.

The wheels 322 are identical so only one is described in detail. Each wheel 322 is comprised of an annular rim 330 having an annular groove 331 in its outer periphery. A rubber O-ring 332 is received in the groove 331. A plurality of equally spaced-apart arms 333 formed integrally with the rim 330 have generally V-shaped bearing sections 334 received in the respective groove 321. The bearing sections 334 of the arms 333 exert forces against the hub 320, but enable the wheel 322 to rotate relative to the hub 320 and enable the wheel 322 to yield as a label 36 is being applied to the merchandise.

As the rubber O-rings 332 have a high coefficient of friction, rotation of the wheels 322 during label application is facilitated. The spacing of the wheels 322 allows the applicator 253 to press the label 36 onto the merchandise without contacting the printing which was applied to the labels 36 by the print head 219. As the label is pressed onto the merchandise, the arms 333 allow the wheels to yield. This yielding action is particularly useful when applying labels to merchandise having irregular surfaces in that the wheels 322 are mounted for both independent rotational and independent yielding movements with respect to each other. The flanges 323 prevent the adjacent wheels 322 from deflecting more than a small amount away from the perpendicular with respect to the hub 320.

Referring to FIG. 24, there is shown an exploded view of the print head 219. The print head frame 221 is shown to comprise a side plate 335 to which the flanges 222 and 223 are joined. A mounting block 336 is molded integrally with the side plate 335. The block 336 has a platen or pressure member 337 and arcuate mounting surfaces 338. The mounting block 336 also has a socket 339 for receiving a projection 340 of the other side plate 341. A post 342 is formed integrally with the side plate 335 in axial alignment with a hole 343 in the side plate 341. A pair of posts 344 formed integrally with the side plate 335 have hooks 345 which engage shoulders 346 of the side plate 341. The side plate 341 has projections 347 which are adapted to fit under projections 348 on the block 336. When the projections 347 are positioned underneath the projections 348, that is, between the projections 348 and the side plate 335, the projection 340 is received in the socket 339, and when the hooks 345 are in engagement with shoulders 346, then the frame 221 is securely but releasably locked together.

The printing bands 220 are mounted in the frame 221 as best shown in FIG. 25. The printing bands 220 are urged against the support or pressure member 337 and are detented because teeth 349 formed on the underside of each of the printing bands 220 are in engagement with notches 350 formed on the side of the support 337. In this position, the projection 340 is shown received in the socket 339, the printing bands are trained partially around driven members in the form of wheels 351, the printing bands 220 are under slight tension, and the wheels are cradled in and rotatable on the mounting surfaces 338. The wheels 351 have notches 352 in which the teeth 349 are received.

Each printing band 220 has a plurality of printing blocks 353. The different printing blocks 353 of each printing band 220 can print different data, as is conventional. The printing blocks 353 are contained in a printing section 354 of the printing band 220. The printing band 220 also contains a non-printing human readable section 355. The human readable section 355 contains human readable indicia. The user knows what data the printing block 353 at the pressure member 337 will print by peering through a window 356.

It is often desirable to change the data which the print head 219 is to print. This is generally accomplished by advancing the printing band 220 to the printing position in which the selected data will be printed on the label. A selector, generally indicated at 357, has a knob 358 and a shaft or tubular portion 359 received by the post 342. The selector 357 is freely rotatable about the post 342 and is movable axially so that its driving members or lugs 360 can be shifted into driving cooperation with any one of the driven members 351. Each driven member 351 has a central hole 361 which is provided with a plurality of notches 362 for receiving respective lugs 360. Each driven member 351 is also chamfered at the central hole 361 as best indicated at 363. In addition to the driving lugs 360, the selector 357 is shown to have a pair of opposed pawls or spring detent fingers 364, the ends of which engage the recesses provided by the chamfering 363. The detent fingers 364 serve to hold the selector 357 in the axial position to which it is manually shifted, but enable the selector 357 to be shifted to any desired position so that its driving members 360 will be in driving engagement with the selected driven member 351. Accordingly, by shifting the selector 357, any one or all of the driven members 351 can be rotated, one at a time, which results in the respective printing bands or bands 220 being selectively moved to the selected position to print the selected data on the labels.

The driving lugs 360 are spaced slightly from the ends of the recesses or notches 362. Should the user attempt to turn the knob 358 so as to apply excessive torque to the selector 357, the driving lugs 360 will deflect and move out of the set of notches 362 in which they are positioned in the driven member 351 and will move into the next set of notches 362 in the same driven member 351. Accordingly, there will be relative rotation between the selector 357 and the driven member 351 in which the lugs 360 are received.

There is a spacer 365 between each of the driven members 351 and bands 220. Each of the spacers 365 has a pair of lugs 365′ which engage around the ends 366 at the ends of the mounting surface 338.

The selector 357 is provided with an annular groove 367 adjacent the knob 358. An indicator, generally indicated at 368, has a split collar 369 with a projection 370 received in the groove 367. The indicator 368 has a rectangular section 371 which defines the window 356. The posts 344 have tongues or guides 344′ which are in engagement in grooves 372 in the rectangular section 371. A pair of pointers 373 disposed on the inner surface of the rectangular section 371 are in alignment with the lugs 360 on the selector 357. Accordingly, the pointers 373 indicate the position of the lugs 360 so that if the selector 357 is not in position to drive the desired driven member 351 and its associated printing band 220, the selector 357 can be shifted to a position in which the lugs 360 are in driving engagement with the desired driven member 351 to advance the associated printing band 220 to the selected position.

As shown in FIG. 24, the side plate 341 has a projection or lug 374 by which the printing head 219 is guided by the frame sections 212 and 213 by respective guides 375 and 376 (see FIGS. 1, 3, 14).

The housing or frame sections 212 and 213 are connected by identical snap-fit connections including generally snap-shaped flexible resilient members 377 arranged along the periphery of the housing section 212 and engaged in undercut recesses 378 in the housing section 213. One of these snap-fit connections is shown in detail in FIG. 5.

The subframe sections 215 and 216 of the subframe 214 are connected to each other and the frame sections 212 and 213 of the frame 211 are connected to the subframe 214 by means of three sets of identical snap-fit connections generally indicated at 379, one of which is shown in detail in FIG. 19. With reference to FIG. 19, the frame sections 212 and 213 have respective sockets 380 and 381 comprised of a plurality of respective flexible resilient fingers 382 and 383. The subframe section 215 has a projection 384 snap-fitted into the socket 380. The projection 384 has a plurality of flexible resilient spring fingers 385. The subframe section 216 has a projection 386 comprised of a plurality of flexible resilient fingers 387 snap-fitted into the socket 381. The subframe section 215 has a projection 388 comprised of a plurality of flexible resilient spring fingers 389 received in a socket 390. The socket 390 is comprised of flexible resilient spring fingers 391. A projection 392 formed integrally with the frame section 212 extends through the socket 380, through the projection 384, and to about the end of the projection 388 in the socket 390. The spring fingers 383 of the socket 381 are made thinner and consequently more flexible than the spring fingers 383 of the socket 380. An attempt to open up the frame 211 by separating the frame sections 212 and 213 will cause the frame section 213 to be separated from the subframe section 216. The frame section 212 will remain connected to the subframe 214. As the frame section 213 is being separated from the subframe 214, the projection 392 prevents the subframe sections 215 and 216 from separating because the spring fingers 389 cannot deflect inwardly because of the interference provided by the projection 392. Once the frame section 213 has been removed, the inside of the apparatus 218 is exposed. It is apparent that accidental unsnapping of the subframe 214 or the frame section 212 from the subframe 214 is obviated by this construction. Further disassembly can be accomplished by deliberately unsnapping the subframe 214 from the frame section 212. This is accomplished by moving the projection 384 out of the socket 380. When this has been accomplished, the projection 392 has moved out of the space between the spring fingers 389 of the projection 388 and consequently the subframe sections 215 and 216 can be separated.

With reference to FIGS. 7 through 9 for example, the subframe section 216 is shown to have four projections 393 which are adapted to be snugly received in recesses 394 at the end of the guide 262. The projections 393 received in the holes 394 assist in removably holding the subframe sections 215 and 216 together.

With reference to FIGS. 1 and 14 the cover 251 is shown to have an L-shaped flange 395 at one end and a projection 396 at its other end. To attach the inking mechanism 252 to the apparatus, the projection 395 is pushed under a shoulder 397 of the frame section 213 and thereafter the cover 251 is snapped into position by causing the projection 396 to snap under a lip 398 of the frame section 213. In this manner, the inking mechanism or inker 252 is removably mounted to the apparatus. To remove the inking mechanism, the user can engage his fingernail beneath an extension 399 of the cover 251, thereby causing the projection 396 to snap around the lip 398.

With reference to FIG. 6, the operator 235 is shown to pivot on the pin 237. It is preferred to pivot the operator 235 at the lower end of the handle 232 in that the user's strongest fingers, namely his index, middle and ring fingers engage the operator 235 at substantial distances from the pivot pin 237, while the user's relatively weak little finger is close to the pivot pin 237. The ends of the pin 237 are undercut as indicated respectively at 403 and 404. The ends 401 and 402 are received in sockets 405 and 406 in respective frame sections 212 and 213. The sockets 405 and 406 are comprised of respective flexible resilient fingers 407 and 408. The operator 235, as best shown in FIGS. 3 and 4, is shown to be generally U-shaped in section. Legs 409 and 410 are shown to be rotatably received about the pin 237. The spiral or torsion spring 238 is shown to be received on pin 237 between the legs 409 and 410. If it is desired to remove the frame section 213, the frame section 213 is moved relatively away from the frame section 212 causing the socket 406 to move out of snap-fit engagement with the end 402. Only when the operator 235 is moved away from the frame section 212 can the end 401 move out of the socket 405 because of interference caused by leg 409. This construction obviates accidental disconnection of the pin 237 from the frame sections 212.

With reference to FIG. 28, there is shown an alternative construction by which a selector **357*a* having a plurality of driving lugs 360*a* like the lugs 360 and also having a pair of opposed pawls 364*a*, selectively controls the setting of a selected driven member or wheel 351*a*. The embodiment of FIG. 28 differs from the embodiment of the print head 219 shown for example in FIGS. 24 through 28 in that each of the driven members 351*a* is provided with an internal annular groove 411 and the chamfering 363 (FIG. 27) is omitted. Accordingly, instead of having the pawl 364*a* engage between adjacent driven members 351 as shown in FIGS. 26 and 27 for example, the pawls 364*a* engage in the groove 411 of one of the driven members 351*a*, and as is preferred in the groove 411 of the same wheel with which the lugs 360*a* are in driving engagement. By this construction, the driving function as well as the detenting function are accomplished by the selector 357*a* in cooperation with a single driven member 351*a***.

FIG. 27 is actually an alternative embodiment which shows the detenting of one of the pawls 364 in recesses or grooves provided by beveling or chamfering 363. FIG. 27 shows one of the wheels 351 as wider than the adjacent wheel 351 to show that the selector 357 in accordance with the invention can work equally well with wheels 351 of different sizes without affecting detenting. With such a construction some of the printing bands 220 can be wider than others as is highly desirable in some applications.

With reference to FIGS. 29 and 30, there is shown another embodiment of a selector generally indicated at **357*b*. The selector 357*b* is the same as the selector 357 in that it has four drive lugs 360*b*, and a pair of opposed pawls 364*b*. The selector 357*b* differs from the selector 357 only in that the selector 357 is of one-piece construction and the selector 357*b* is of two-piece construction. The selector 357*b* comprises body sections 412** and 413 snap-fitted together. The body section 412 has a non-circular hole, and in particular a square hole 414, and the body section 413 has a corresponding square portion 415 received in the hole 414. By this construction, the body sections 412 and 413 are incapable of rotating relative to each other. The body section 413 has four flexible resilient fingers 416 terminating at projections 417 shown in FIG. 29 to be received over a bead 418. In this position, an annular flange 419 is in abutment with a shoulder 420 on the body section 412. The selector 357*b* is used in the same manner as the selector 357. If desired, the selector 357*a* (FIG. 28) can be made in two parts as illustrated in FIGS. 29 and 30.

Referring to the embodiment of FIG. 31, there is shown a print head generally indicated at 219*c* having two spaced-apart sets of printing members 220*c*. The print head 219*c* has two sets of mounting blocks 366*c*, two sets of driven members 351*c* and posts 344*c*, all formed integrally with side plate 335*c*. Flanges 222*c* and 223*c* and gear sections 224*c* and 225*c* are spaced apart wider than the flanges 222 and 223 and gear sections 224 and 225. Accordingly, the pair of gears (not shown) which would mesh with gear sections 224*c* and 225*c* would have to be spaced apart by a greater distance than the gears 242 and 243. It is also apparent that ball tracks (not shown) which would correspond to the ball tracks 230 and 231 would have to be spaced wider apart, as would be readily apparent to one skilled in the art. Side plate 341*c* carries a guide member 374*c*. The side plate 341*c* rotatably mounts a pair of selectors 357*c* for the respective set of driven members 351*c*. The posts 344*c* mount respective rectangular sections 371*c* which provide respective windows 356*c*. It is readily apparent that with slight modifications the print head 219*c* can be operated by a mechanism the same in principle and construction as the mechanism which operates the print head 219.

Referring to the embodiment of FIGS. 32, 33 and 34, there is provided a selector 357*d* which is identical to the selector 357. Printing members take the form of print wheels 220*d*. Each print wheel 220*d* is shown to be identical and comprises printing elements 421 carried by an annular hub 422. A mounting and detenting wheel 423 is shown to be formed integrally with each side of the hub 422. The wheels 423 have generally annular outer surfaces 424 received in sockets 425 of adjacent mounting members 426. The sockets 425 comprise an annular portion 427 and a pair of flexible resilient arms 428 formed integrally therewith. Accordingly, the print wheels 220*d* can be inserted either axially into the sockets 425 or they can be inserted into or removed from the respective sockets 425 by spreading arms 428. Mounting members 426 are provided with recesses 429 in which offset integrally formed detent pawls or spring fingers 430 and 431 are disposed. The pawl 430 of one mounting member 426 is cooperable with notches 430' to effect detenting of an adjacent print wheel 220*d* on one side of the mounting member 426, and the other is cooperable with notches 431' to effect detenting of the adjacent print wheel 220*d* on the other side of the mounting member 226.

Each wheel 220*d* has a central hole 432, the ends of which are chamfered as indicated at 433. As best shown in FIG. 34, pawls 364*d* are received in the chamfering between adjacent wheels 220*d* and drive lugs 360*d* are in driving engagement with the adjacent print wheel 220*d*. If desired, detenting can be effected in the manner illustrated in the embodiment of FIG. 28.

Referring to FIGS. 35 through 54 and 58 through 70, there is shown an alternative embodiment of the label printing and applying apparatus generally indicated at 210*a*. In this embodiment, those components which are generally related to those in the embodiment of FIGS. 1 through 34 are indicated by the same reference characters, with the addition of the letter "*a*". Those components of the apparatus 210*a* which differ from or are in addition to components in the embodiment of FIGS. 1 through 34 are more specifically indicated with reference characters starting with the number 500.

Figure 35:
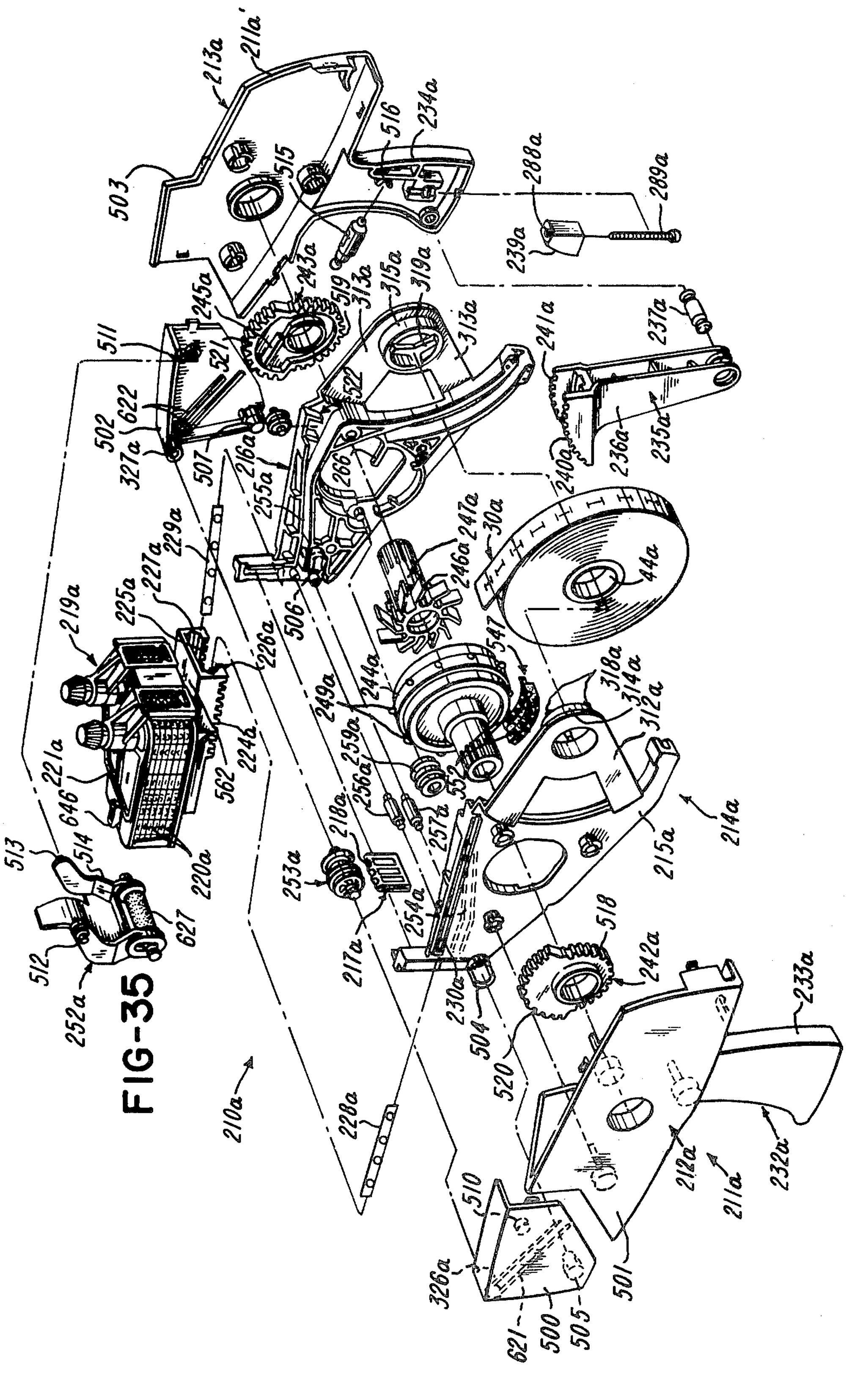
FIG. 35 is an exploded perspective view of another embodiment of the label printing and applying apparatus.

Referring initially to FIG. 35, the apparatus 210*a*, which includes a housing 211*a*, has two-part frame sections generally indicated at 212*a* and 213*a*. The frame 211*a* includes a handle 232*a* having handle portions 233*a* and 234*a*. The frame sections 212*a* and 213*a* have relatively movable frame parts 500 and 501, and 502 and 503. The handle portion 232*a* is a part of the frame part 501, and the handle portion 234*a* is a part of the housing part 503. A subframe 214*a* includes subframe sections 215*a* and 216*a*. The subframe section 215*a* and the movable frame part 500 respectively have a socket 504 and a pivot pin 505. Similarily, the subframe section 216*a* and the movable frame part 502 respectively have a socket 506 and a pivot pin 507. Applicator 253*a* snaps into sockets 326*a* and 327*a* in respective frame parts 500 and 502. The frame parts 500 and 502 and the applicator 253*a* are pivotal about pivot pins 505 and 506 as a unit with respect to the respective frame parts 501 and 503.

The subframe sections 215*a* and 216*a* receive and retain platen 217*a* which has a delaminator such as a peel edge or turning edge 218*a*. Print head 219*a*, having printing members 220*a* carried by its print head frame 221*a*, is movable relatively toward and away from the platen 217*a*. The print head frame 221*a* has integrally formed racks 224*a* and 225*a* and respective tracks 226*a* and 227*a*. The subframe section 215*a* has a track 230*a* and the subframe section 216*a* has an opposite track (not shown) for respective ball bearings 228*a* and 229*a*.

Frame parts 500 and 502 have respective sockets 510 and 511 in which respective pivot pins 512 and 513 of inker body 514 of an inking mechanism 252*a* are received. As the print head 219*a* moves toward and away from the platen 217*a*, the inking mechanism 252*a* oscillates first in one direction and thereafter in the opposite direction about its pivot pins 512 and 513 to effect inking of the print head 219*a*.

The apparatus 210*a* has an operator 235*a* in the form of a lever 236*a* pivotally mounted by a post 237*a*. Stop block 239*a* is adjustable by means of a screw 289*a* received in a threaded bore 288*a*. The operator 235*a* is urged away from the stop block 239*a* by means of a spring assembly 515 which bears at one end against a socket 516 formed partly by handle portion 233*a* and partly by handle portion 234*a* and at its other end against a socket 517 (FIG. 47) integral with the operator 235*a*. Gear sections 240*a* and 241*a* carried by the lever 236*a* are in meshing engagement with respective compound gears 242*a* and 243*a*. Specifically, the gear sections 240*a* and 241*a* mesh with respective sections 518 and 519, and sections 520 and 521 mesh with respective racks 224*a* and 225*a* of the print head 219*a*. Toothed driver 244*a* is driven by a pawl 245*a* which cooperates with a ratchet wheel 246*a*. Detent mechanism 247*a* is coupled to the toothed driver 244*a*. Teeth 249*a* of the driver 244*a* engage the supporting material of the composite web in the manner shown and described in the embodiment of FIGS. 1 through 34 and 45. Rolls 256a and 257a guide the composite web 30a and the supporting material web 32a, respectively, and roll 259a cooperates with the toothed driver 244a. The composite web 30a is in the form of a roll carried on a core 44a which can be inserted into the housing through an opening 211a'. The core 44a is mounted by hubs 318a and 319a carried by respective leaf springs 312a and 313a. Annular brake members 314a and 315a exert slight braking forces against only the core 44a.

With reference to FIGS. 36, 37 and 38, the composite web 30a has label material 31a releasably adhered to and carried by supporting or backing material 32a. Label material 31a is cut transversely at longitudinally spaced-apart intervals by transverse cuts 33a. The composite web 30a is like the composite web 30 except that there is an additional group of cuts 38b between groups of cuts 38a. The shapes of the groups of cuts 38a and 38b are identical to each other and to the shape of the cuts of groups 38.

With reference to FIGS. 39 through 44, there is illustrated a method by which either the apparatus 210 or the apparatus 210a can be loaded. In loading the apparatus, for example the apparatus 210a, the composite web 30a in roll form is inserted into the frame 211a into position on the hubs 318a and 319a. While the user holds the labeler 210a in his one hand by means of the handle 233a and depresses the lever 236a slightly to release brake 522, the marginal end portion 30' of the web is inserted through brake 522 into a passageway formed partly by the groove 254a (FIG. 35) and the groove 255a. He now passes the marginal end portion 30' of the composite web 30a partly around the roll 256a and over platen 217a and then between a guide 523 and the applicator 253a. The user then grasps the marginal end portion 30' between the thumb and index fingers of his other hand, and while holding the apparatus 210a in an attitude that will prevent the delaminated labels 36a from coming into contact with and adhering either to the apparatus 210a or to the supporting material web 32a, the composite web 30a is pulled in a direction away from the applicator 253a such that the supporting material 32a is caused to undergo a sharp change of direction as it passes around peel edge 218a at the terminal end of the platen 217a. In that the marginal end portion 30' is pulled in a direction substantially parallel to the platen and the supporting material undergoes a sharp bend of about 180°, in so doing, the supporting material 32a is torn as indicated at 32t as it is forced past the guide 523 and against the underside of the platen 217a and is pulled to the position shown in FIG. 40. The marginal end portion 30' is pulled to a predetermined point 232' at the front tip of the handle 232a so that just the right number of labels 36a are delaminated. The result is that an end section 30'' of the supporting material 32a is completely stripped of a plurality (such as about seven) labels 36a. The labels on the end section 30'' are readily removed without having to manually remove them one-by-one from the supporting material 32a. If desired, the marginal end portion 30' can be severed from the end section 30'' at the tear 32t preferably through one group of cuts 38a in the supporting material web 38a so that the end section which is devoid of labels 36a can be passed between the toothed member 244a and the cooperating die roll 259a, as best shown in FIG. 42. In the position shown in FIG. 42, slackness exists in the end section 30''. By manually operating the operator 235a, the end section 30'' can be advanced through the apparatus until all the slackness has been removed as best shown in FIG. 43. The apparatus 210a is now ready for use. In this position, each manual operation of the operator 235a will cause a label 36a to be printed and thereafter dispensed to the position shown in FIGS. 43 and 44 in which the trailing edge of the label 36a is still adhered to the supporting material 32a.

Referring to FIGS. 45 through 48, the relationship of the spring assembly 515 to the handle 232a and to the operator 235a is shown in greater detail than in FIG. 35. The spring assembly 515 is shown to have a tubular body or sleeve 524 having a circular cylindrical internal wall 525. One end of the tubular body 524 is open as indicated at 526 and its other end is closed off by an end wall 527. A connector 528 having a circular cylindrical outer surface 529 substantially greater than 180° in extent is formed integrally with the end wall 527. The connector 528 is received by the socket 516 which has a circular cylindrical inner surface 516' slightly greater than 180° in extent. The surface 529 extends transversely with respect to the tubular body 524 and more specifically the axis of the surface 529 extends perpendicularly and through the axis of the tubular section 524. A tubular plunger 530 having a circular cylindrical outer surface 531 is shown to be received in slidable contact with the wall 525 of the body 524. The plunger 530 is open at one end as indicated at 532 and is closed off at its other end by an end wall 533. A connector 534 having a circular cylindrical outer surface 535 substantially greater than 180° in extent is formed integrally with the end wall 533. The surface 535 extends transversely with respect to the plunger 530 and more specifically the axis of the outer surface 535 extends perpendicular to and through the axis of the plunger 530. The connector 534 is received by the socket 517 which has a circular cylindrical inner surface 517' slightly greater than 180° in extent. A compression spring 536 is received in a bore 537 of the plunger 530 and abuts at one end against the end wall 533. The other end of the spring 536 abuts against the end wall 527 of the body 524. A keeper 538 formed integrally with the end wall 527 extends coaxially within the inside wall 525. The body 524 has a pair of opposed longitudinally extending slot; 539 and 540. The plunger 530 has a pair of opposed resilient spring fingers 541 and 542 having respective abutment surfaces 543 and 544. The ends of the slots 539 and 540 constitute stops 545 and 546. In the position shown in FIG. 47, the abutment surfaces 543 and 544 are in abutment with respective stops 545 and 546. In that the plunger 530 is constructed of resilient plastic material, the fingers 541 and 542 can resiliently yield while the spring assembly 515 is being assembled, specifically as the end 532 of the plunger 530 is inserted into the open end 526 of the tubular body 524. As the abutment surfaces 543 and 544 clear the stops 545 and 546 while the plunger 541 is being pushed into the tubular body 524, the spring fingers 541 and 542 first deflect and then spring outwardly to the position shown in FIG. 47. Assembly of the spring assembly 515 is now complete and the tubular body 524 and the plunger 530 can now undergo limited relative movement with respect to each other. The spring assembly 515 is easy to assemble in manufacturing and is easy to install in the apparatus 210a as a modular spring assembly or unit. In that the sockets 516 and 517 are resilient they can expand resiliently to receive respective connectors 528 and 534. During use the spring assembly 515 normally urges the operator 235a to its initial position as shown in FIG. 45. When the operator 235a is operated by the user, the plunger 530 telescopes into the tubular body 524 as best shown in FIG. 46. Upon subsequent release of the operator 235a, the spring assembly 515 returns the operator 235a to its initial position.

With reference to FIGS. 35, 45 and 49, there is shown a lubricant applicator generally indicated at 547. The purpose of the applicator 547 is to apply a lubricant to the peripheral surface of the toothed driver 244a to retard the accumulation of gum (adhesive, paper dust, and the like) on the toothed driver 244a. The applicator 547 is shown to be comprised of a curved strip of porous flexible resilient material, for example, felt. The applicator 547 is generally hat-shaped in transverse section. The applicator 547 is disposed between the outer surface of the toothed driver 244a and flanges 548 and 549 of respective subframe sections 215a and 216a. The flanges 548 and 549 support the applicator 547. A portion 550 of the applicator is disposed between the ends of the flanges 548 and 549 so it is apparent that the subframe sections 215a and 216a and their respective flanges 548 and 549 amply support and retain the applicator 547. The applicator 547 has a surface 551 which is in light contact with the peripheral surface of the toothed driver 242a. This light contact assures that lubricant contained in the applicator 547 is transferred to the peripheral surface of the driver 244a, but that the frictional drag on the driver 242a is negligible. The surface 551 of the applicator 547 corresponds generally to the contour of the peripheral surface of the driver 244a. Transverse slits or slots 547' in the applicator 547 facilitate bending of the strip to the shape of the periphery of the driver 244a. As best shown in FIG. 35, the applicator 547 has a groove 552 in which the teeth 249a of the driver 244a travel.

With reference to FIG. 45, it is noted that the applicator 547 is positioned in contact with that portion of the driver 244a which is out of the path of the supporting material web 32a. This obviates any wicking or bleeding of lubricant from the applicator 547 to the supporting material 32a. This is especially beneficial during such time as the apparatus 210a is not in use. Although the applicator 547 could be in the form of a roll, it is preferred to use an applicator in the form of a strip which is easy to manufacture and assemble. The applicator 247 can contain any suitable lubricant which can retard the transfer of gum from the supporting material 32a onto the driver 244a. By way of example, not limitation, the absorbent applicator 547 can contain the following suitable lubricant: Dow Corning 1107 fluid, a liquid silicone, described in Bulletin: 05-169 dated February, 1967, of the Chemical Products Division, Dow Corning Corporation, Midland, Michigan 48640.

Figure 50:
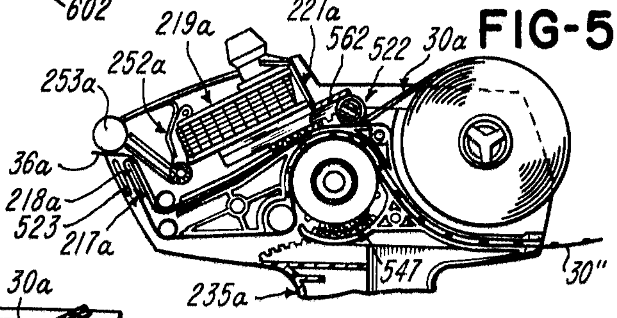
FIG. 50 is a fragmentary elevational view showing the operating components of the apparatus in their initial positions.
Figure 52:
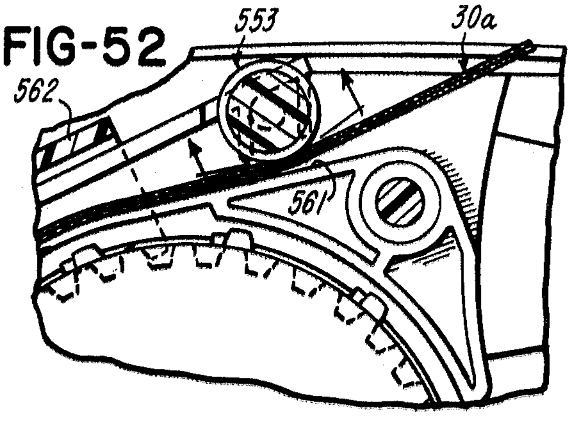
FIG. 52 is a fragmentary view similar to FIG. 51, but showing the print head out of the operative position with the brake.
Figure 51:
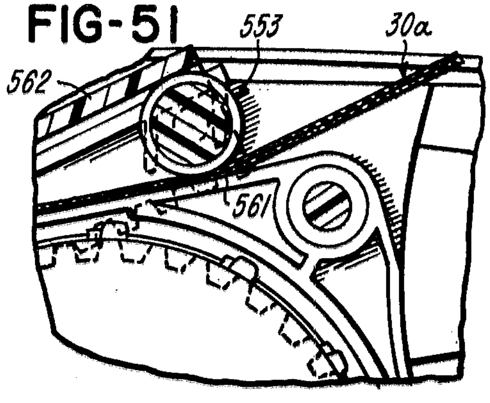
FIG. 51 is an enlarged fragmentary view showing a portion of the apparatus shown in FIG. 50, and showing especially the print head in its operating position with a brake in accordance with the invention.

Referring to FIGS. 50 through 54, the brake 522 is shown to a roll 553. The roll 553 has a pair of spaced apart O-rings 554 and 555 comprised of resilient material such as rubber. The roll 553 has stub ends 556 and 557 received in respective tracks 558 and 559 in respective subframe sections 215a and 216a. It is apparent that the roll 553 is rotatable and also movable relatively toward and away from surfaces 560 and 561 of respective subframe sections 215a and 216a. As shown in FIGS. 50 and 51, end portion 562 of print head frame 221a is in engagement with the O-rings 554 and 555 of roll 553, and the composite web 30a is clamped between the roll 553 and the surfaces 560 and 561. Accordingly, in this position of the brake 522, because of the friction exerted between the roll 553 and end portion 562 of the print head 219a, rotation of the roll 553 is prevented. Consequently, the composite web 30a which is in frictional engagement with the roll 553 and is clamped between the roll 553 and surfaces 560 and 561 is prevented from being advanced toward the delaminator 218a. In this position of the print head 219a (in which the operator 235a is in its initial position), a printed label 36a is in applying position relative to applicator 253a ready to be applied to an article. Once the label 36a has been applied, the user can again operate the operator 235a which causes the print head 219a to move toward the platen 217a. As the print head 219a moves toward the platen 217a, the portion 562 of the frame 221a of the print head 219a moves out of contact with the roll 553. At the printing position of the print head 219a, the portion 562 of the frame 221a is in the position shown in FIG. 52. When the user releases the operator 235a, the spring assembly 515 causes the toothed driver 244a to advance the composite web 30a and to effect return of the print head 219a to the position shown in FIG. 51. During return of the print head 219a from the position shown in FIG. 52 to the position shown in FIG. 51, the roll 553 permits the composite web 30a to advance as it rolls on the advancing web 30a. However, upon the substantial completion of travel of the print head 219a, the portion 562 again operates the brake 552 to effect clamping of the composite web 30a between the roll 553 and surfaces 560 and 561. The brake 522 is simple in construction and automatic in its operation and yet it serves the purpose of preventing any paying out of the composite web 30a from the roll during application of the label 36a. Such paying out of the web 30a can result in the event that the cuts 33a through the label material 31a are not complete so that the trailing edge of one label 36a remains connected to the leading edge of the next subsequent label 36a. As is evident in this embodiment of the invention the brake 522 exerts a substantial braking force on the web 30a, while brake surfaces 318a and 319a exert only a slight braking force on the core 44a.

Figure 54:
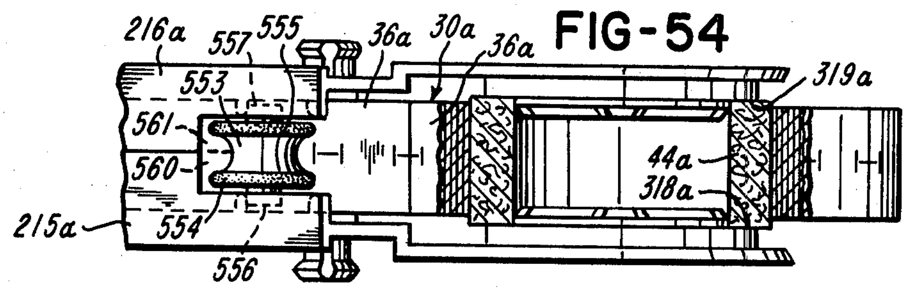
FIG. 54 is a top plan view, partly in section, of a fragmentary portion of the apparatus.
Figure 55:
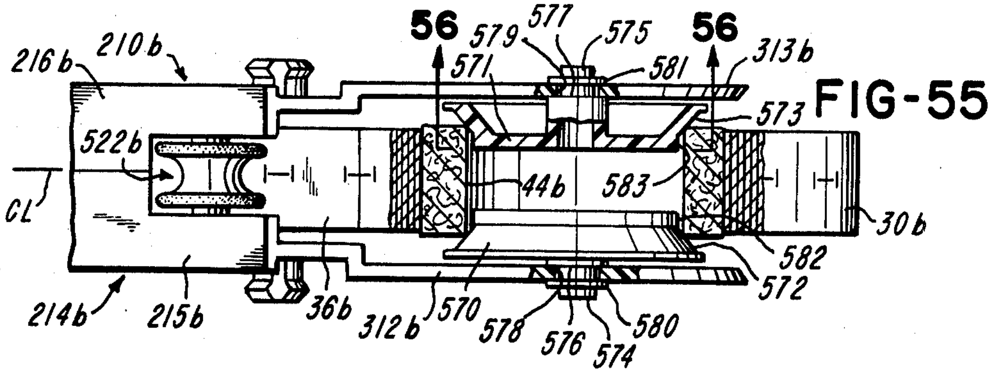
FIG. 55 is a top plan view, partly in section, of a fragmentary portion of a modified apparatus.
Figure 56:
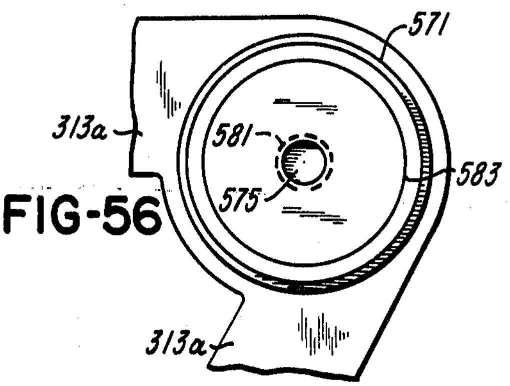
FIG. 56 is a sectional view taken along line 56—56 of FIG. 55.
Figure 57:
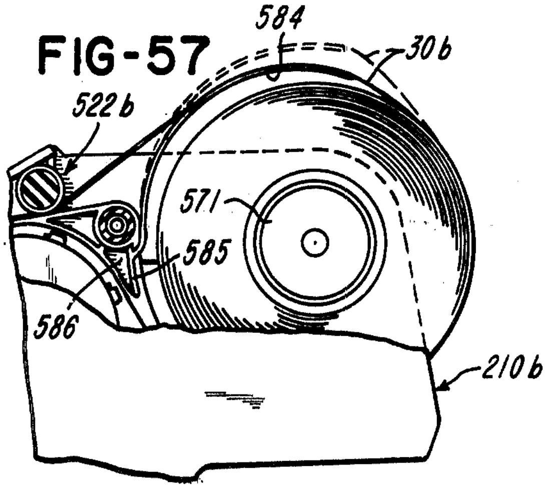
FIG. 57 is an elevational view, partly in section, on a reduced scale from that of FIGS. 55 and 56, showing a spring for assisting the unwinding of a supply roll.

With reference to FIGS. 55 through 57, there is shown a modification for the embodiment of FIGS. 1 through 34 and for the embodiment of FIGS. 35 through 54 and 58 through 70. Components which are generally related to those of either the embodiments of FIGS. 1 through 34 or 35 through 54 and 58 through 70 are indicated by the same reference characters, with the addition of the letter "*b*". Label printing and applying apparatus 210b includes subframe 214b having subframe sections 215b and 216b. The apparatus 210b differs from apparatus 210a only in the respect that leaf springs 312a and 313a rotatably mount core 44b of composite web 30b. More specifically, axially aligned, one-piece, rolls 570 and 571 are rotatably mounted by arms or leaf springs 312a and 313a. The rolls 570 and 571 are identical in construction. The rolls 570 and 571 have frustroconical surfaces 572 and 573 which serve to automatically center the core 44b with respect to the center line CL of the subframe 214b. The rolls 570 and 571 have respective hubs 574 and 575 having respective bearing shoulders 576 and 577. The bearing shoulders 576 and 577 bear against the arms 312b and 313b. As the rolls 570 and 571 rotate the shoulders 576 and 577 prevent other portions of the respective rolls 570 and 571 from rubbing on the arms 312b and 313b. The arms 312b and 313b are flexible and resilient enough to enable the core 44b to be inserted on rolls 570 and 571 and yet rigid enough to enable the core **44*b* to be mounted as illustrated in FIGS. 55 and 57. The arms 312*b* and 313*b* are sufficiently yieldable to accommodate for manufacturing variations in the length of core 44*b*. The hubs 574 and 575 are rotatably received in holes 578 and 579 in arms 312*b* and 313*b*. Spring clips 580 and 581 prevent the hubs 574 and 575 from shifting off the arms 312*b* and 313*b* but permit the rolls 570 and 571 to rotate. Rolls 570 and 571 have respective circular cylindrical portions 582 and 583 which prevent the core 44*b* from slipping off when the composite web 30*b* is advanced. With reference to FIG. 57, a resilient device 584, illustrated as being a curved leaf spring, serves to facilitate the gradual paying out of the composite web 30*b*. In that the apparatus 210*b* causes the composite web 30*b* to be pulled once for each actuation and return cycle of the operator (235 or 235*a*), and in that the apparatus is capable of printing and applying multiple labels (36, 36*a* or 36*b*) in succession per second, the device 584 is conducive to the gradual unwinding of the composite web roll. When the composite web 30*b* is advanced, the resilient device 584 will move from the position shown by phantom lines to the position shown by solid lines in FIG. 57. As the roll unwinds gradually, the device 584 moves to the position shown by phantom lines in FIG. 57. One end 585 of the device 584 is retained in fixed position relative to a subframe 214*b* by fitting into a retained pocket 586 formed partly in the subframe section 215*b* and partly by the subframe section 216*b***.

Figure 58:
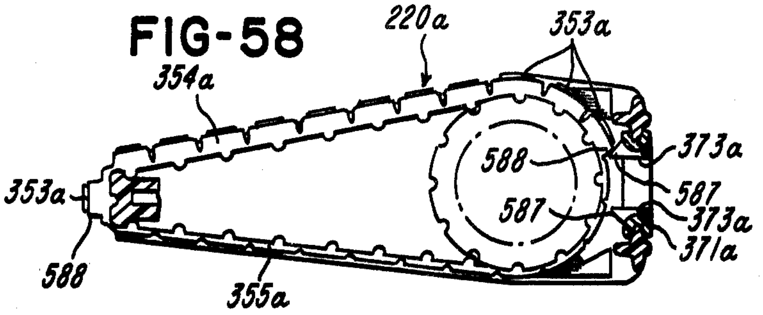
FIG. 58 is a view similar to FIG. 25, but illustrating an improved arrangement by which the human readable section of the printing member is prevented from being moved to the printing zone.

With reference to FIG. 58, there is shown diagrammatically the structure which is already shown in greater detail in FIGS. 24, 25 and 26, for example. Specifically, printing band **220*a* has a printing section 354*a* and a non-printing human readable section 355*a*. Such a printing band is well known and is disclosed in Canadian Pat. No. 653,495. The printing section 354*a* has printing blocks 353*a* and the non-printing section contains human readable indicia (FIG. 25) representative of the data which the printing blocks 353*a* are capable of printing. The printing section 354*a* is thicker than the non-printing section 355*a* as best seen in FIG. 58. The pointers 373 (FIG. 24) are modified to the extent that they are extended as shown at 373*a* in FIG. 58. The pointers 373*a* are molded integrally with the frame 371*a* which can be shifted in a direction parallel to the axis of the driven members 351*a* (only one of which is shown in FIG. 58). It is apparent that the pointers 373*a* include stop faces 587 and that the printing blocks 353*a* adjacent the non-printing section 355*a* have abutment faces 588. Thus, the non-printing section 355*a* is incapable of being moved to the printing position at which it would be inked by the ink roller. Inadvertent movement of the non-printing section to the printing and inking zone would result in inking of the human readable indicia which would make them difficult to read; but this problem is obviated by the present invention. The invention can be applied as well to type wheels of the type illustrated in FIGS. 32 through 34** which can have a printing section and an adjacent non-printing human readable section.

Figure 59:
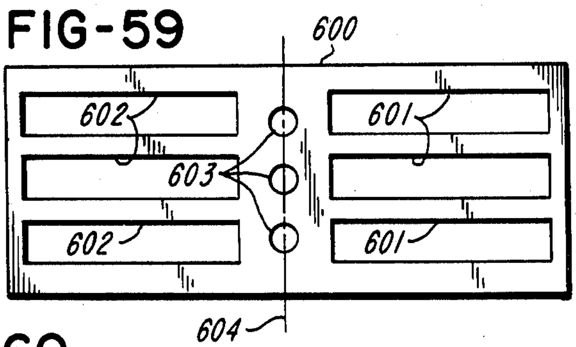
FIG. 59 is a top plan view of a sheet used in making a platen.
Figure 61:
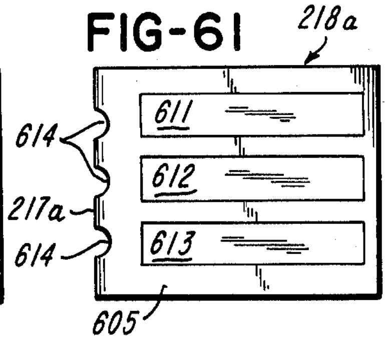
FIG. 61 is a top plan view of the completed platen.
Figure 60:
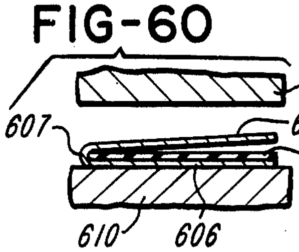
FIG. 60 is a diagrammatic sectional view of the sheet after having been inversely bent, together with a piece of moldable material, positioned in a press.
Figure 62:
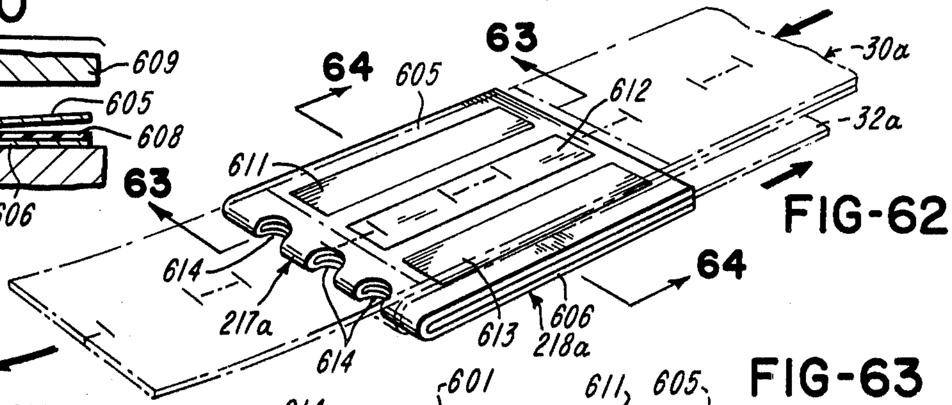
FIG. 62 is a perspective view of the platen showing the composite web by phantom lines.
Figure 63:
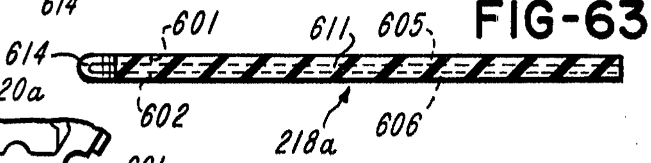
FIG. 63 is a sectional view taken along line 63—63 of FIG. 62.
Figure 64:
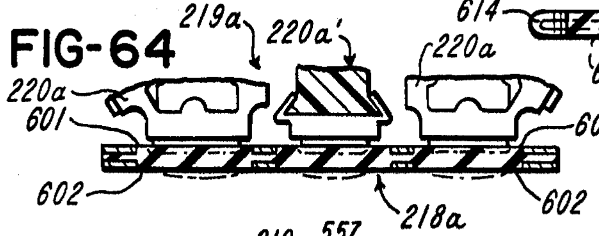
FIG. 64 is a sectional view taken along line 64—64 of FIG. 62, but showing additionally printing members in printing cooperation with individual platen sections of the platen.
Figure 53:
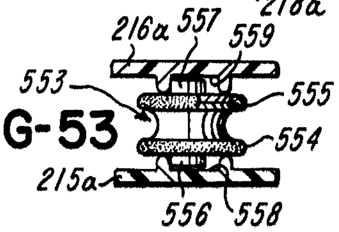
FIG. 53 is a sectional view taken along line 53—53 of FIG. 52.

With reference to FIGS. 59 through 64, there is illustrated a method by which the platen **217*a* is made. Referring initially to FIG. 59, there is provided a flat sheet composed of bendable substantially rigid material. Although any suitable sheet material can be employed, it is preferred to use steel having a smooth surface, for example, polished stainless steel. Elongated sets of holes 601 and 602 and round holes 603 are shown to be cut through the sheet 600. The holes 601 and 602 are elongated in the same direction and are generally rectangular in shape. The holes 601 and 602 are symmetrical about a center line 604 extending through the centers of holes 603, with the holes 601 and 602 being in alignment with each other and with the holes 603. If desired the center line 604 of the inverse bend need not pass through the centers of the holes 603. The sheet 600 is inversely bent about the line 604 to provide a pair of plates or plate portions 605 and 606 joined by a bight portion 607. With a sheet of flexible, resilient moldable material 608 disposed between the plates 605 and 606 there is provided a sandwich arrangement which is placed between press members 609 and 610 of a press to effect extrusion of the moldable material into the space within the holes 601 and 602. This extrusion can be accomplished by applying pressure using the press members 609 and 610 accompanied by suitable heating means (not shown) for heating the moldable material 608. For this purpose, the platen members 609 and 610 can be heated. As shown in FIGS. 63 and 64 the sets of holes 601 and 602 are in alignment with each other. The platen 217*a* thus has flexible resilient platen sections 611, 612 and 613 which can yield independently of each other during printing as illustrated in FIG. 64. The composite web 30*a* is omitted from between printing members 220*a* and 220*a*' and the platen 217*a* in FIG. 64 for the sake of clarity. This means that each line of printing characters can produce quality printing irrespective of minor manufacturing variations in the print head or the platen which might otherwise cause poor printing quality. The plates or plate portions 605 and 606 cooperate to support the platen sections 611, 612 and 613 only at their peripheral edges, and more specifically they support the sections 611, 612 and 613 along the entirety of their respective peripheral edges but the platen sections 611, 612, and 613 are otherwise unsupported so that they can yield even beyond the surface of the underside of the platen 217*a*. The resultant platen 217*a* has a relatively sharp delaminator or peel edge 217*a* and the holes 603 provide generally semi-circular notches 614 at the peel edge 217*a*. Each notch 614 constitutes an interruption in the edge which reduces the area of contact with the web of supporting material 32*a* thereby reducing friction therebetween as the web 32*a* is drawn in the direction of arrow 615. With reference to FIGS. 61 and 62, the moldable material 608 which would otherwise exist in the notches 614** is preferably trimmed away.

Referring to FIG. 66, the inking mechanism **252*a* is shown in its operative inking position between the print head 219*a* and the platen 217*a*. The inking mechanism 252*a* includes the inker body 514 and an ink roller 620 carried by the inker body 514. The inking mechanism 252*a* also includes a pair of tracks 621 and 622 which guide the ink roller 620 as the print head 219*a* is driven toward and away from the platen 217*a*. With reference to FIG. 67, the one-piece inker body 514, which is composed of a flexible resilient material, has a pair of slotted arms 623 and 624 having respective elongated aligned slots 625 and 626. The ink roller 620 includes an ink receptive, tubular, porous ink roll 627 received by a hub 628 having hub portions 629 and 630. The hub portion 630 has a fluted projection 361 and the hub portion 629 has a bore 632 into which the projection 631 is adapted to be press-fitted. The ink roll 627, composed for example of rubber or the like, is received by the hub portions 629 and 630, as best shown in FIG. 69**. The hub portions 629 and 630 have respective integral flanges or bearing rolls 633 and 634, which are adapted to ride on bearing surfaces 635 and 636 of the print head 219*a*. Stub ends 637 and 638 mount respective rollers 639 and 640, and 641 and 642. The rollers 640 and 641 are received in the elongated slots 625 and 626 of slotted portions 623 and 624, the rollers 639 and 642 are received in respective tracks 621 and 622.

The inker body 514 also has integrally formed arms or leaf springs 643 and 644 which carry the integrally formed pivot pins 512 and 513 received in the respective sockets 510 and 511.

As the print head 219*a* moves toward the platen 217*a* (FIG. 66), the constant slope of the tracks 621 and 622 causes the ink roller 620 to travel across the ink and the printing members 220*a* at the constant rate. When the print head 217*a* is in printing cooperation with the label 36*a* at the printing zone, the ink roller 620 has moved to the position shown by phantom lines (FIG. 66). When the print head 219*a* moves away from the platen 217*a*, a spring finger or leaf spring 645, formed integrally with the inker body 514, causes the bearing rolls 633 and 634 to roll along bearing surfaces 635 and 636. During all this travel of the inker body 514 and the ink roller 620 which it carries, the slotted portions 523 and 524 serve to mount the ink roller 620 and tracks 621 and 622 define the path of travel of the ink roller 620. Installation of the inker body 514 and its ink roller 620 is accomplished by flexing together the leaf springs 643 and 644 so that the respective pivot pins 512 and 513 can be inserted into the respective sockets 510 and 511. The inker body 514 can be removed by flexing together leaf springs 643 and 644. The ink roller 620 can be installed or removed from the inker body by flexing apart the slotted arms 623 and 624. FIG. 68 shows the inker body 514 and its ink roller 620 being removed from the apparatus, while housing part 502 and the corresponding housing part 502 (FIG. 65) are in an open position relative to the respective housing parts 501 and 503.

The print head 219*a* has two rows of printing bands as is shown in somewhat greater detail in FIG. 31. In order to print a third line of data between the two lines of printing members 22*a*, a slug 646 (FIGS. 66, 69 and 70) is inserted into the print head frame 221*a*. As best shown in FIG. 70, the slug 646 comprises a base 647 having a dovetail portion 648, a printing member 220*a*' and has a mating portion 648' received by the dovetail 648. The base 647 has a projection 650 receivable in a recess 651 in the print head frame 221*a*. The base 647 has an elongated extension 652 having a projection 653 which is received in a recess 654 in the print head frame 221*a*. In this manner, the slug 646 can be inserted into a slot 655 in the print head frame 221*a* and resiliently snapped into place by means of the projection 656 which can be used to facilitate insertion or removal of the slug 646.

It is preferred to mold the driver or feed wheel 244 of a material which incorporates a lubricant to diminish the amount of gum or adhesive that is transferred to the feed wheel 244 during use to prevent improper feeding. By incorporating the lubricant in the feed wheel 244 the surface of the feed wheel 244 has a low coefficient of friction. However, the teeth 249 are adequate to grip and drive the web 32. One specific material to be used to mold the feed wheel is an acetal resin combined with polytetrafluoroethylene lubricants. One such material is sold commercially under the name Thermocomp, Number KL-4030 by Liquid Nitrogen Processing Corporation, Malvern, Pennsylvania, U.S.A. The remainder of the apparatus in FIGS. 1 through 70, except for the platens 217 and 217*a*, O-rings 282 and 332, the ball bearings 228, 228*a*, 229 and 229*a*, the spring 238, the washers 365, rubber printing members 220, 22*a* and 220*a*, portion 648', spring 536, applicator 552, O-rings 554 and 555, clips 581 and 582, and the resilient device 584, are composed of suitable lightweight moldable plastic materials, for example, acetal, acrylonitrile-butadiene-styrene, or the like, but the ink rolls 311 and 627 are preferably constructed of porous vinyl. Accordingly, the apparatus is very light in weight, and easy and convenient to use with a minimum of fatigue.

With reference to FIGS. 71 through 73, the portion 562 of the print head 219*a* includes a member 700 positioned to cooperate with the roll 553. The member 700 moves as a unit with the print head 219*a*. As shown, the print head 219*a* is mounted for rectilinear movement and as the print head 219*a* moves from the position shown in FIG. 71 to the initial position shown in FIG. 72, the member 700 rolls onto the roll 553 and causes the composite web 30*a* to move toward the surface 561 to apply a brake force to a composite web 30*a*, thereby clamping the composite web 30*a* between the surface 561 and the roll 553. When the member 700 acts on the roll 553, rotation of the roll 553 is prevented. The leading label 36 that is ready to be applied is adhered to the web 32 at its trailing marginal edge. As the leading label 36 is applied to the merchandise, the leading label tugs or pulls on the web 32. Absent the brake 522, the composite web 30 would be drawn toward the platen and the web 32 would cease to be under the desired tension. Because of this slack condition in the web 32, the next label to be printed would be out of registration with the print head 219*a*. With the brake 522 of the invention, which is the self-energizing type, the tugging force applied to the web 30 during application of a label causes the brake 522 to be even more effective because of the converging angle presented by the surface 561 and the member 700. The member 700 is resiliently urged against the roll 553 as best shown in FIG. 72, and in that position the member 700 is shown to be bowed slightly due to its flexibility. The member 700 is shown to comprise a leaf spring or spring finger which is shown to be integrally connected to the portion or extension 562 of the print head 219*a*. Although the member 700 is molded integrally with the print head frame 211, it can be made separately and suitably attached to the print head frame 211, if desired. The member 700 is shown to be disposed generally between and straddled by the end portions of the racks 224*a* and 225*a*. It is apparent that the brake is effective when the print head 219*a* is in the initial position shown in FIG. 72. When the print head 219*a* is in a position in which the member 700 is out of cooperation with the roll 553, as for example in the position shown in FIG. 71, the composite web 30*a* is free to be drawn between the roll 553 and the surface 561.

The embodiment of FIGS. 71 through 73 is useful with the structure illustrated in FIG. 54 for example, in which the apparatus applies a slight braking force to the core 44*a* of the label roll; it is also useful with the structure of FIGS. 55 and 56, for example, in which the label core is mounted on a pair of rotatably mounted rolls 570 and 571; and it is also useful with the structure of FIG. 57 in which a resilient device 584 is used. Accordingly, the embodiment shown in FIGS. 71 through 73 is useful in a combination with other structure set forth in various other embodiments of the invention.

Other embodiments and modifications of this invention will suggest themselves to those skilled in the art, and all such of these as come within the spirit of this invention are included within its scope as best defined by the appended claims.

I claim:

1. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, and means effective upon completion of the sequence for applying braking force to the composite web upstream of the delaminator to prevent the web from advancing toward the delaminator during application of a printed label by the applicator, wherein the means for applying braking force includes a rotatably mounted brake roll and means providing a back-up surface between which the composite web is disposed, the printing means comprising a print head for moving the brake roll into braking coaction with the composite web.

2. Apparatus for printing and applying labels as defined in claim 1, including a pair of rotatable rolls for mounting the supply roll.

3. Apparatus for printing and applying labels as defined in claim 1, wherein the brake roll has resilient material at its periphery.

4. Apparatus for printing and applying labels as defined in claim 1, including rotatable means for rotatably mounting the supply roll.

5. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, means effective upon completion of the sequence for applying braking force to the composite web upstream of the delaminator to prevent the web from advancing toward the delaminator during application of a printed label by the applicator, and a resilient device for contacting the composite web downstream of the place the composite web is paid out of the supply roll and upstream of the means for applying braking force to the composite web, the device being resiliently yieldable during operation of the feeding means and subsequently returnable to effect gradual paying out of the composite web from the roll.

6. Apparatus for printing and applying labels as defined in claim 5, wherein the resilient device comprises a leaf spring.

7. Apparatus for printing and applying labels as defined in claim 5, wherein the braking force applying means includes a brake roll for contacting the composite web.

8. Apparatus for printing and applying labels as defined in claim 5, including rotatable means for rotatably mounting the supply roll.

9. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web for feeding partially delaminated labels to the applicator, means for operating the printing means and the feeding means in sequence, means including a brake roll for applying braking force to the composite web upstream of the delaminator to prevent the web from advancing toward the delaminator during application of a printed label by the applicator, the printing means having means effective upon substantial completion of the sequence of operation for moving the brake roll into clamping cooperation with the composite web and for preventing rotation of the brake roll.

10. Apparatus for printing and applying pressure sensitive labels utilizing a supply roll comprising a label core and a composite web wound on the core, the composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, first brake means engageable solely with the label core for continuously applying a braking force to the label core, second brake means separate from the first brake means and effective upon completion of the sequence for applying braking force to the composite web downstream of the first brake means and upstream of the delaminator to prevent the web from advancing toward the delaminator during application of a printed label.

11. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, continuously operable first brake means for preventing excessive unwinding of the supply roll, and intermittently operable second brake means separate from the first brake means and effective upon completion of the sequence for applying braking force to the composite web downstream of the first brake means and upstream of the delaminator to prevent the web from advancing toward the delaminator during application of a printed label.

12. Apparatus for printing and applying labels as defined in claim 11, wherein the second brake means includes a resilient member.

13. Apparatus as defined in claim 11, wherein the second brake means includes a flexible resilient spring finger.

14. Apparatus for printing and applying pressure sensitive labels utilizing a supply roll comprising a web having pressure sensitive labels releasably secured to a web of supporting material, the apparatus comprising: printing means including a platen and a cooperable print head for printing on successive labels, a delaminator for delaminating successive printed labels from the supporting material web, means for applying successive printed labels, means engageable with the supporting material web for feeding partially delaminated labels to the applicator, means for operating the printing means and the feeding means in sequence, and means for applying braking force to the composite web upstream of the delaminator to prevent the web from advancing toward the delaminator during application of a printed label by the applicator, wherein the braking force applying means includes a resilient member carried by the print head.

15. In an apparatus for printing and applying pressure sensitive labels utilizing a supply roll comprising a composite web having pressure sensitive labels releasably secured to a web of supporting material, and having printing means for printing on successive labels, means for delaminating successive printed labels from the supporting material web, an applicator for applying successive printed labels, means engageable with the supporting material web downstream of the delaminating means for feeding the composite web to present partially delaminated labels to the applying means, means for operating the printing means and the feeding means in sequence, and means for applying a braking force to the web upstream of the delaminating means, the improvement characterized in that the braking force applying means includes a rotatable brake roll and means providing a back-up surface, the composite web being directed to pass between the brake roll and the surface, the web being capable of moving between the brake roll and the surface when the feeding means is operated, and means mounting the brake roll and the surface for movement relatively toward each other to enable the application of a braking force to the composite web in response to movement of the operating means.

16. Apparatus for printing and applying labels as defined in claim 15, wherein the brake roll has a frictional outer surface.

17. Apparatus for printing and applying labels as defined in claim 15, wherein the mounting means mounts the brake roll for movement toward and away from the surface.

18. Apparatus for printing and applying labels as defined in claim 15, wherein the surface is stationary.

19. Apparatus for printing and applying pressure sensitive labels utilizing a supply roll comprising a composite web having pressure sensitive labels releasably secured to a web of supporting material, the apparatus comprising: printing means including a print head for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, and means effective upon completion of the sequence for applying braking force to the composite web upstream of the delaminator to prevent the web from advancing toward the delaminator during application of a printed label by the applicator, wherein the means for applying braking force includes a rotatably mounted brake roll and means providing a back-up surface between which the composite web is disposed, the brake roll having end portions, a pair of tracks for receiving the end portions of the roll, and the print head including means acting on the brake roll near the end of the sequence for clamping the composite web between the brake roll and the surface and for preventing rotation of the brake roll.

20. Apparatus for printing and applying pressure sensitive labels utilizing a supply roll comprising a composite web having pressure sensitive labels releasably secured to a web of supporting material, the apparatus comprising: printing means including a print head for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, and means effective upon completion of the sequence for applying braking force to the composite web upstream of the delaminator to prevent the web from advancing toward the delaminator during application of a printed label by the applicator, wherein the means for applying braking force includes a rotatably mounted brake roll and means providing a back-up surface between which the composite web is disposed, the print head including means acting on the brake roll near the end of the sequence for clamping the composite web between the brake roll and the surface and for preventing rotation of the brake roll.

21. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, and means effective upon completion of the sequence for applying braking force to the composite web upstream of the delaminator to prevent the web from advancing toward the delaminator during application of a printed label by the applicator, wherein the means for applying braking force includes a rotatably mounted brake roll and means providing a back-up surface between which the composite web is disposed, the printing means includes a print head having a resilient member for moving the brake roll into braking coaction with the composite web.

22. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, and means effective upon completion of the sequence for applying braking force to the composite web upstream of the delaminator to prevent the web from advancing toward the delaminator during application of a printed label by the applicator, wherein the means for applying braking force includes a rotatably mounted brake roll and means providing a back-up surface between which the composite web is disposed, the printing means comprising a print head for moving the brake roll into braking coaction with the composite web, wherein the braking force applying means includes a flexible resilient spring finger.

23. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, and means effective upon completion of the sequence for applying braking force to the composite web upstream of the delaminator to prevent the web from advancing toward the delaminator during application of a printed label by the applicator, wherein the means for applying braking force includes a rotatably mounted brake roll and means providing a back-up surface between which the composite web is disposed, the printing means comprising a print head for moving the brake roll into braking coaction with the composite web, means mounting the print head for reciprocating movement, the print head including a portion for contacting the brake roll directly near the end of the sequence.

24. Apparatus for printing and applying labels as defined in claim 23, wherein the brake roll includes a pair of O-rings disposed in spaced-apart relationship at its periphery.

25. Apparatus for printing and applying pressure sensitive labels utilizing a supply roll comprising a composite web having pressure sensitive labels releasably secured to a web of supporting material, the apparatus comprising: means for rotatably mounting the supply roll, printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, means effective upon completion of the sequence for applying braking force to the composite web upstream of the delaminator to prevent the web from advancing toward the delaminator during application of a printed label by the applicator, and a resilient device including a leaf spring for contacting the composite web downstream of the place the composite web is paid out of the supply roll and upstream of the means for applying braking force to the composite web, the device being resiliently yieldable during operation of the feeding means and subsequently returnable to effect gradual paying out of the composite web from the roll.

26. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web for feeding partially delaminated labels to the applicator, means for operating the printing means and the feeding means in sequence, means including a brake roll for applying braking force to the composite web upstream of the delaminator to prevent the web from advancing toward the delaminator during application of a printed label by the applicator, the printing means having means effective upon substantial completion of the sequence of operation for moving the brake roll into clamping cooperation with the composite web and for preventing rotation of the brake roll, wherein the means for applying braking force includes a resilient member for causing force to be applied to the brake roll.

27. Apparatus for printing and applying pressure sensitive labels utilizing a supply roll comprising a label core and a composite web wound on the core, the composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, first brake means engageable solely with the label core for continuously applying a braking force to the label core, second brake means separate from the first brake means and effective upon completion of the sequence for applying braking force to the composite web downstream of the first brake means and upstream of the delaminator to prevent the web from advancing toward the delaminator during application of a printed label, wherein the second brake means includes a resilient member.

28. Apparatus for printing and applying pressure sensitive labels utilizing a supply roll comprising a label core and a composite web wound on the core, the composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, first brake means engageable solely with the label core for continuously applying a braking force to the label core, second brake means separate from the first brake means and effective upon completion of the sequence for applying braking force to the composite web downstream of the first brake means and upstream of the delaminator to prevent the web from advancing toward the delaminator during application of a printed label, wherein the second brake means includes a brake roll and a cooperable resilient member.

29. Apparatus for printing and applying pressure sensitive labels utilizing a supply roll comprising a label core and a composite web wound on the core, the composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, first brake means engageable solely with the label core for continuously applying a braking force to the label core, second brake means separate from the first brake means and effective upon completion of the sequence for applying braking force to the composite web downstream of the first brake means and upstream of the delaminator to prevent the web from advancing toward the delaminator during application of a printed label, wherein the second brake means includes a brake roll controlled by the printing means for movement into and out of braking cooperation with the composite web.

30. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, continuously operable first brake means for preventing excessive unwinding of the supply roll, and intermittently operable second brake means separate from the first brake means and effective upon completion of the sequence for applying braking force to the composite web downstream of the first brake means and upstream of the delaminator to prevent the web from advancing toward the delaminator during application of a printed label, wherein the printing means includes a platen and a cooperable print head, and the second brake means includes a resilient member carried by the print head.

31. Apparatus for printing and applying pressure sensitive labels utilizing a supply roll comprising a composite web having pressure sensitive labels releasably secured to a web of supporting material, the apparatus comprising: printing means for printing on successive labels, a delaminator for delaminating successive printed labels from the supporting material web, an applicator for applying successive printed labels, means engageable with the supporting material web downstream of the delaminator for feeding the composite web to present partially delaminated labels to the applicator, means for operating the printing means and the feeding means in sequence, continuously operable first brake means for preventing excessive unwinding of the supply roll, and intermittently operable second brake means separate from the first brake means and effective upon completion of the sequence for applying braking force to the composite web downstream of the first brake means and upstream of the delaminator to prevent the web from advancing toward the delaminator during application of a printed label, wherein the second brake means includes a brake roll controlled by the printing means for movement into and out of braking cooperation with the composite web.

32. In an apparatus for printing and applying pressure sensitive labels utilizing a supply roll comprising a composite web having pressure sensitive labels releasably secured to a web of supporting material, and having printing means for printing on successive labels, means for delaminating successive printed labels from the supporting material web, an applicator for applying successive printed labels, means engageable with the supporting material web downstream of the delaminating means for feeding the composite web to present partially delaminated labels to the applying means, means for operating the printing means and the feeding means in sequence, and means for applying a braking force to the web upstream of the delaminating means, the improvement characterized in that the braking force applying means includes a rotatable brake roll and means providing a back-up surface, the composite web being directed to pass between the brake roll and the surface, the web being capable of moving between the brake roll and the surface when the feeding means is operated, and means mounting the brake roll and the surface for movement relatively toward each other to enable the application of a braking force to the composite web in response to movement of the operating means, and wherein the braking force applying means includes a resilient member cooperable with the brake roll for urging the brake roll and the surface relatively toward each other.

* * * * *